(12) United States Patent
Butler et al.

(10) Patent No.: US 11,204,466 B2
(45) Date of Patent: Dec. 21, 2021

(54) OPTICAL FIBER PHOTONIC INTEGRATED CHIP CONNECTOR INTERFACES, PHOTONIC INTEGRATED CHIP ASSEMBLIES, AND METHODS OF FABRICATING THE SAME

(71) Applicant: Corning Research & Development Corporation, Corning, NY (US)

(72) Inventors: Douglas Llewellyn Butler, Painted Post, NY (US); Alan Frank Evans, Beaver Dams, NY (US); James Scott Sutherland, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/692,302

(22) Filed: Nov. 22, 2019

(65) Prior Publication Data

US 2021/0157056 A1  May 27, 2021

(51) Int. Cl.
*G02B 6/26* (2006.01)

(52) U.S. Cl.
CPC ..................... *G02B 6/26* (2013.01)

(58) Field of Classification Search
CPC .................................................. G02B 6/26
USPC ........................................................ 385/50
See application file for complete search history.

(56) References Cited

U.S. PATENT DOCUMENTS

| | | | | |
|---|---|---|---|---|
| 5,018,817 A | * | 5/1991 | Suzuki | G02B 6/25 385/49 |
| 5,703,980 A | * | 12/1997 | MacElwee | G02B 6/2551 385/30 |
| 5,774,609 A | * | 6/1998 | Backlin | G02B 6/4239 385/49 |
| 7,010,199 B2 | * | 3/2006 | Kim | G02B 6/30 385/129 |
| 7,054,519 B1 | * | 5/2006 | Novotny | G02B 6/3508 385/140 |
| 7,142,748 B1 | * | 11/2006 | Yang | G02B 6/30 385/30 |
| 9,594,220 B1 | | 3/2017 | Sutherland | |
| 9,766,411 B2 | | 9/2017 | Butler et al. | |
| 10,107,967 B1 | | 10/2018 | Butler et al. | |
| 10,162,112 B2 | | 12/2018 | Sutherland | |
| 10,234,644 B1 | | 3/2019 | Butler et al. | |

(Continued)

*Primary Examiner* — Kaveh C Kianni
(74) *Attorney, Agent, or Firm* — Michael E. Carroll, Jr.

(57) ABSTRACT

Optical fiber photonic integrated chip connector interfaces and photonic integrated chip assemblies utilizing low-profile optical fibers and methods thereof are disclosed. In one embodiment, an optical fiber photonic integrated chip (PIC) connector interface includes at least one low-profile optical fiber having an end face, at least one core, and a cladding layer, wherein the end face is non-rotationally symmetric with respect to the at least one core, and the cladding layer includes at least one minimum perimeter point that is a minimum distance from the at least one core as compared to remaining perimeter points of the cladding. The PIC connector interface further includes an interconnect substrate including a fiber mounting surface, and a mechanical coupling surface. The at least one low-profile optical fiber is disposed on the fiber mounting surface such that one or more surfaces of the cladding defining the at least one minimum perimeter point faces away from the fiber mounting surface.

28 Claims, 17 Drawing Sheets

(56) References Cited

U.S. PATENT DOCUMENTS

| | | | |
|---|---|---|---|
| 10,481,336 B2* | 11/2019 | Menard | G02B 6/00 |
| 10,514,506 B2 | 12/2019 | Brusberg et al. | |
| 10,545,290 B2 | 1/2020 | Bennett et al. | |
| 10,564,348 B2* | 2/2020 | Kopp | G02B 6/305 |
| 10,914,891 B2* | 2/2021 | Kopp | G02B 6/024 |
| 10,921,518 B2* | 2/2021 | Barwicz | G02B 6/1223 |
| 2002/0012885 A1* | 1/2002 | Steinberg | G02B 6/136 430/321 |
| 2002/0196998 A1* | 12/2002 | Steinberg | G02B 6/30 385/14 |
| 2003/0169981 A1* | 9/2003 | Nakanishi | G02B 6/42 385/92 |
| 2004/0057253 A1* | 3/2004 | DeCusatis | G02B 6/425 362/581 |
| 2006/0008199 A1* | 1/2006 | Glebov | G02B 6/43 385/15 |
| 2006/0291793 A1* | 12/2006 | Carpenter | G02B 6/30 385/137 |
| 2009/0067787 A1* | 3/2009 | Yamamoto | G02B 6/3652 385/50 |
| 2014/0185991 A1* | 7/2014 | de Jong | G02B 6/3853 385/79 |
| 2015/0063755 A1* | 3/2015 | Doany | G02B 6/425 385/59 |
| 2016/0077282 A1* | 3/2016 | Lipson | G02B 6/3652 385/30 |
| 2017/0343738 A1* | 11/2017 | Kobyakov | G02B 6/30 |
| 2018/0172905 A1 | 6/2018 | Fortusini et al. | |
| 2018/0188454 A1* | 7/2018 | Lipson | G02B 6/245 |
| 2018/0246279 A1 | 8/2018 | Lohse et al. | |
| 2018/0246286 A1 | 8/2018 | Lohse et al. | |
| 2018/0267255 A1* | 9/2018 | Butler | G02B 6/3885 |
| 2019/0064454 A1* | 2/2019 | Evans | C03B 23/047 |
| 2019/0086614 A1* | 3/2019 | Wang | G02B 6/305 |
| 2019/0094460 A1* | 3/2019 | Brusberg | G02B 6/3885 |
| 2019/0154931 A1* | 5/2019 | Masters | G02B 6/4227 |
| 2020/0241220 A1* | 7/2020 | Evans | G02B 6/13 |
| 2020/0363588 A1* | 11/2020 | Brusberg | G02B 6/4403 |
| 2020/0378865 A1* | 12/2020 | Gnausch | H04B 10/803 |

* cited by examiner

OPTICAL FIBER PHOTONIC INTEGRATED CHIP CONNECTOR INTERFACES, PHOTONIC INTEGRATED CHIP ASSEMBLIES, AND METHODS OF FABRICATING THE SAME

FIELD

The present disclosure generally relates to optical interfaces and assemblies and, more particularly, to optical fiber photonic integrated chip connector interfaces and photonic integrated chip assemblies utilizing low-profile optical fibers.

BACKGROUND

Communication networks are used to transport a variety of signals such as voice, video, data transmission, and the like. High bandwidth and low power requirements in data center and high performance computer applications are driving optical links closer to mid-board electronic processors and switches. Thus, shorter optical fiber runs are desired in these applications. Photonic integrated circuits (PICs) can be mounted on support substrates (e.g., printed circuit boards (PCBs), interposers, or multi-chip modules (MCM)) adjacent to, and in close proximity with, electronic process and/or switch components.

PICs typically include a waveguide layer having one or more waveguides disposed therein for propagating optical signals. PICs can be mounted on a support substrate in one of two ways, with its waveguide layer facing up away from the support substrate, or with its waveguide layer facing down toward the support substrate (i.e., flip-chip mounted).

During PIC fabrication, many PICs are fabricated on the same wafer. To singulate individual PICs, a slot is first etched around the perimeter of each PIC using a deep etch process (e.g., reactive ion etch (RIE) or Bosch etch). The etch process provides a smooth surface on exposed PIC waveguide end faces for low loss coupling to external waveguides. It also helps define and guide subsequent PIC cleaving/dicing operations.

Because etching processes are slow and expensive, the etched slot only extends downward through a portion of the PIC, such as 100-150 µm. To reduce process cost and process time, it may be preferable to make the etched, slot even more shallow (e.g., 25-50 µm).

However, the depth of the etched slot may be less than a radius of an optical fiber meant to be edge-coupled to the end face of the waveguide layer of the PIC. As the core of an optical fiber is within a center of an optical fiber, when the etched slot is less than a radius of the optical fiber, the core of the optical fiber cannot be aligned with the waveguide within the waveguide layer of the PIC.

SUMMARY

Embodiments of the present disclosure are directed to optical fiber and photonic integrated chip (PIC) connector interfaces and PIC assemblies utilizing low-profile optical fibers and shallow etched slots in a waveguide substrate of a PIC assembly. By enabling a shallow etched slot, the manufacturing time and costs to fabricate PIC assemblies is reduced. Low-profile optical fibers, such as D-shaped optical fibers or flat optical fibers, are edge-coupled to the waveguide layer of the PIC assembly. As used herein, "low-profile optical fiber(s)" means an optical fiber having at least one flat outer surface along its entire length with a non-round cross-section that provides a reduced distance between the center of the core to the flat outer surface. Conventional optical fibers are round and generally have a uniform distance from, the center of the core to any surface of the optical fiber, and thus the have the full round geometry (e.g. round over 360 degrees) and are conventional optical fibers. Compared with a conventional round optical fibers the low-profile optical fibers may advantageously fit within the shallow edge slots of the waveguide substrate as disclosed herein.

In one embodiment, an optical fiber photonic integrated chip (PIC) connector interface includes at least one low-profile optical fiber having an end face, at least one core, and a cladding layer, wherein the end face is non-rotationally symmetric with respect to the at least one core, and the cladding layer includes at least one minimum perimeter point that is a minimum distance from the at least one core as compared to remaining perimeter points of the cladding. The PIC connector interface further includes an interconnect substrate including a fiber mounting surface and a mechanical coupling surface. The at least one low-profile optical fiber is disposed on the fiber mounting surface such that one or more surfaces of the cladding defining the at least one minimum perimeter point faces away from, the fiber mounting surface.

In another embodiment, a photonic integrated chip (PIC) assembly includes a PIC and an optical fiber PIC connector interface. The PIC includes a waveguide substrate having a mechanical coupling edge and a waveguide layer including at least one waveguide and an optical coupling edge. The waveguide layer is positioned on the waveguide substrate and the at least one waveguide terminates at the optical coupling edge. The optical fiber PIC connector interface includes at least one low-profile optical fiber having an end face, at least one core, and a cladding layer. Tire end face is non-rotation ally symmetric with respect to the at least one core. The cladding layer includes at least one minimum perimeter point that is a minimum distance from the at least one core as compared to remaining perimeter points of the cladding The optical fiber PIC connector interface further includes an interconnect substrate having a fiber mounting surface. Tire at least one low-profile optical fiber is disposed on the fiber mounting surface such that one or more surfaces of the cladding defining the at least one minimum perimeter point faces away from the fiber mounting surface. The end face of the at least one low-profile optical fiber is edge-coupled to the optical coupling edge of the waveguide layer.

In another embodiment, a method of assembling a photonic integrated circuit (PIC) assembly includes aligning at least one core of at least one low-profile optical fiber with at least one waveguide of a waveguide layer of a PIC. The at least one low-profile optical fiber further includes an end face and cladding layer, wherein the end face is non-rotationally symmetric with respect to the at least one core, and the cladding layer includes at least one minimum perimeter point that is a minimum distance from the at least one core as compared to remaining perimeter points of the cladding. The at least one low-profile optical fiber is bonded to a fiber mounting surface of an interconnect substrate such that one or more surfaces of the cladding defining the at least one minimum perimeter point faces away from the fiber mounting surface. The waveguide layer is positioned on a waveguide substrate having a mechanical coupling edge. The waveguide layer includes an optical coupling edge and the at least one waveguide terminates at the optical coupling edge. The method further includes edge-coupling the end face of the at least one low-profile optical fiber with the optical coupling edge of the waveguide layer.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

DETAILED DESCRIPTION

Embodiments are directed to photonic integrated chip (PIC) assemblies and optical fiber PIC connector interfaces incorporating a low-profile optical fiber, such as a D-shaped optical fiber, that enable PIC to have a shallow singulating etched slot (e.g., 25-50 μm). However, the shallow etched slot prevents edge coupling of optical fibers to the PIC assembly because the depth of the etched slot is less than the diameter of optical fibers. As described in in detail herein, embodiments of the present disclosure use low-profile optical fibers that provide for PIC assemblies that are less expensive to manufacture and provide faster manufacturing throughput because the shallow singulating etch slot requires less etching time.

Figure 1A:
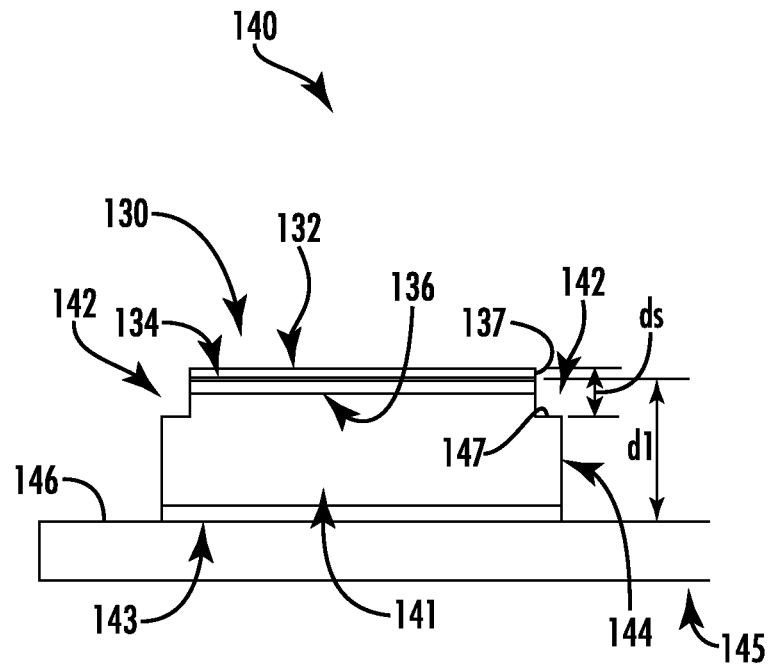
FIG. 1A schematically illustrates an example photonic integrated chip (PIC) according to one or more embodiments described and illustrated herein.

Referring to FIG. 1A, a PIC 140 mounted to a support substrate 145 (e.g., a printed circuit board (PCB), an interposer, or a multi-chip module (MCM)) is schematically illustrated. The PIC 140 includes a waveguide substrate 141 comprising an edge 144, an edge slot 142, and a waveguide layer 130. The PIC 140 may be fabricated by any known or yet-to-be-developed process. In a non-limiting example, the waveguide substrate 141 is fabricated from silicon. The waveguide layer 130 may include any number of waveguides 134 disposed between a first cladding layer 132 and a second cladding layer 136.

As an example and not a limitation, the first cladding layer 132, the second cladding layer 136 and the one or more waveguides 134 are fabricated by growing or otherwise depositing material on the waveguide substrate 141. Tire indices of refraction of the first cladding layer 132, the second cladding layer 136 and the one or more waveguides 134 are such that optical signals are maintained within the one or more waveguides 134.

As another non-limiting example, the PIC 140 may be configured as a glass substrate that includes laser-written waveguides at or near its surface, or internal to body of the glass substrate.

Individual PICs 140 may be singulated from a mother wafer. To singulate individual PICs 140, a slot is formed around the perimeter of each PIC assembly, such as using a deep etch process (e.g., reactive ion etch (RIE) or Bosch etch). Tins etch results in the edge slot 142 shown in FIG. 1A. The edge slot 142 defines a ledge that protrudes a distance away from the optical coupling edge 137 of the waveguide layer 130, and a surface 147 of the ledge is offset from a center of the at least one waveguide by an offset depth $d_s$. The etch process provides a smooth surface on exposed PIC waveguide end faces that define an optical coupling edge 137 for low loss coupling to external waveguides (e.g., ID-shaped optical fibers as described in more detail below). Tire edge slots 142 also help define and guide subsequent PIC cleaving/dicing operations, such as mechanical dicing to separate individual PICs 140 from the mother wafer. Because etching processes are slow and expensive, the etched slot only extends downward through a portion of the PIC, such as 100-150 μm. To reduce process cost and process it is preferable to make the edge slot 142 even more shallow (e.g., 25-50 μm). The arrangement of FIG. 1A provides for a first distance $d_1$ between the waveguide 134 of the waveguide layer 130 and the support surface 146 of the support, substrate 145. An example range of values for $d_1$ is 0.3-0.5 mm, but it could be larger or smaller depending on the thickness of the waveguide substrate 141. It is noted that the edge slot 142 may also be formed by a laser-damage-and etch process or by dicing.

In the illustrated embodiment, the PIC 140 is mounted to a support surface 146 of the support substrate 145 by an adhesive 143 with the waveguide layer 130 facing up in a direction away from the support surface 146. As described in more detail below, one or more optical fibers having at least one optical core defining an external waveguide are positioned within the slot 142 such as the end faces of the one or more optical fibers are edge-coupled to the optical coupling edge 137 of the waveguide layer 130, thereby optically coupling the cores of the one or more optical fibers to the one or more waveguides 134 of the waveguide layer 130.

Figure 1B:
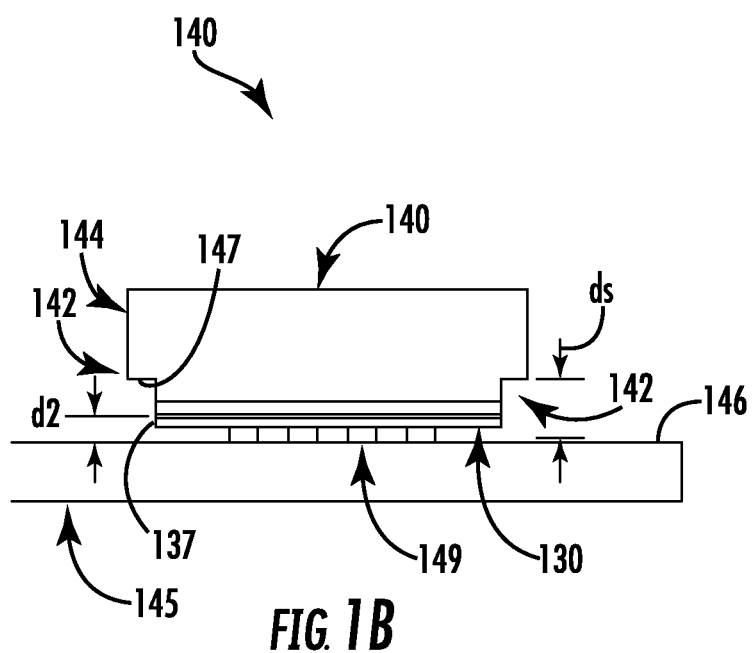
FIG. 1B schematically illustrates the example PIC illustrated by FIG. 1A in a flip-chip mounting arrangement on a support substrate according to one or more embodiments described and illustrated herein.

Referring now to FIG. 1B, an alternative mounting arrangement between the PIC 140 and the support substrate 145 is illustrated. In this example, the PIC 140 is flip-chip mounted to the support substrate 145 by an array of solder balls 149 such that the waveguide layer 130 faces the support surface 146 of the support substrate 145. The advantage to system performance of flip-chip mounted PIC assemblies is that the electrical traces will be very short, and low inductance connections are provided through solder bumps instead of long, higher inductance wire-bonds that would cause higher electrical transmission losses.

This arrangement provides for a second distance $d_2$, which is the vertical distance between the waveguide 134 and the support surface 146 of the support substrate 145 when there is no well in the support surface 146. An example range of values for $d_2$ is 35-85 μm; however it could be larger or smaller depending on the mounting technology (e.g., solder balls or bumps, conductive or non-conductive adhesive, etc.).

PIC assembly interconnection solutions should accommodate the vertical clearances of $d_1$ and $d_2$ to provide for optical coupling between the PIC assembly and external waveguides.

Figure 1C:
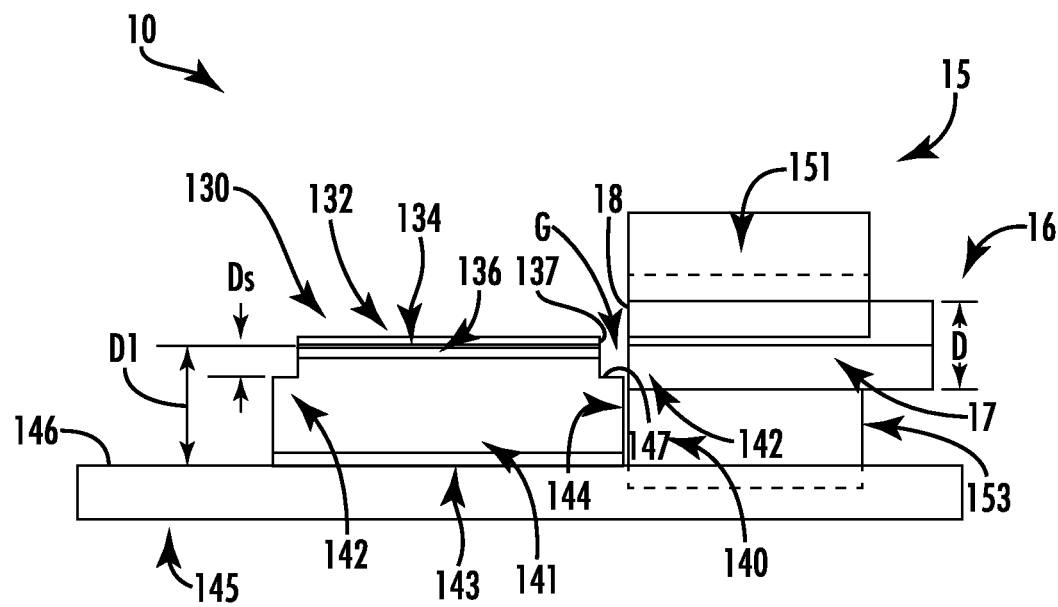
FIG. 1C schematically illustrates the example PIC illustrated by FIG. 1A and an example optical fiber interface.

Referring now to FIG. 1C, a PIC assembly 10 comprising a PIC 140 and an optical fiber PIC connector interface 15 is illustrated. Edge interconnections to PIC waveguides often employ fiber arrays mounted in alignment substrates. In the example of FIG. 1C, the optical fiber PIC connector interface 15 includes at least one round optical fiber 16 having at least one fiber core 17, a V-groove substrate 151 (also referred to herein as an "interconnect substrate"), and a cap 153. The at least one optical fiber 16 is disposed within a V-groove of the V-groove substrate, and the cap 153 assists in maintaining the at least one optical fiber 16 within the V-groove. It should be understood that any of fire V-grooves described herein may be a groove taking on any other shape, such as a U-shape or a rectangular shape.

As stated above, it is desirable to make the depth of the edge slot 142 as small as possible to reduce manufacturing time and cost. However, the diameter D of the optical fiber 16 is such that, when the at least one core 17 of the optical fiber 16 is aligned with the waveguide 134 of the waveguide layer 130, an end face 18 of fire optical fiber 16 contacts the edge 144 of the waveguide substrate 141. This introduces a gap G (e.g., 5-20 μm wide) along the optical axis that induces unwanted optical loss. Further, the low profile configuration can also cause the cap 153 (if used) to interfere with the support surface 146 of the support substrate 145.

Referring once again to FIG. 1B, the small second distance $d_2$ and etch depth $d_s$ prevent an optical fiber PIC connector interface 15 as shown in FIG. 1C from being edge-coupled to the optical coupling edge 137 of the waveguide layer 130.

Figure 2:
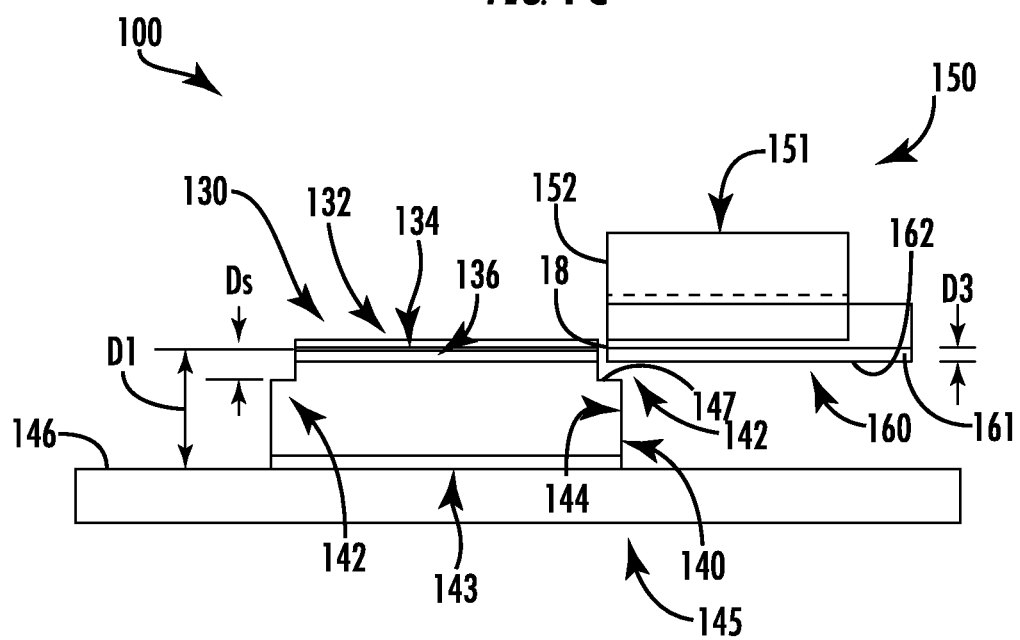
FIG. 2 schematically illustrates an example PIC assembly according to one or more embodiments described and illustrated herein.
Figure 3:
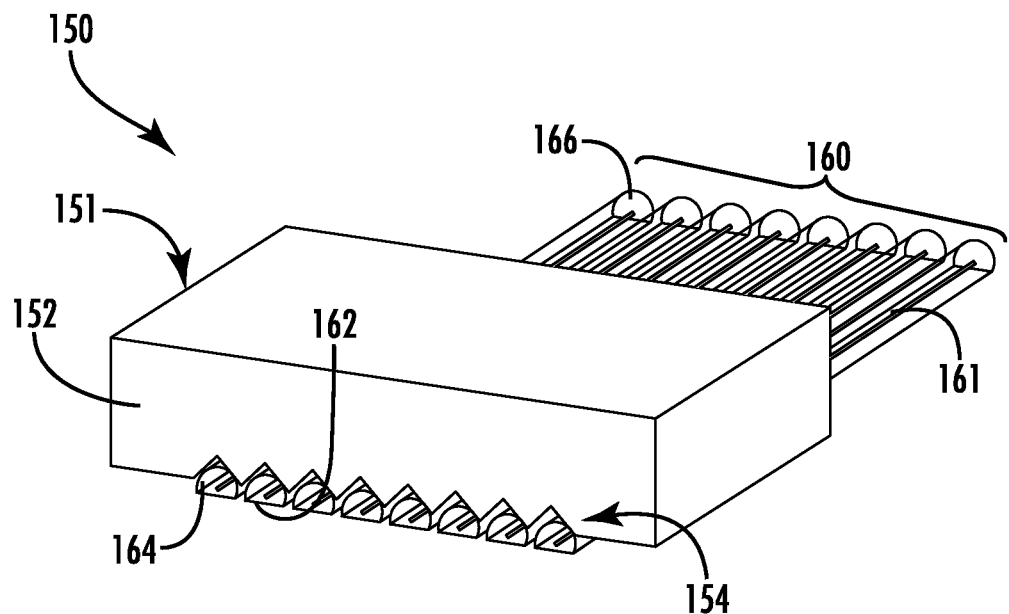
FIG. 3 schematically illustrates a perspective view of an example optical fiber PIC connector interface according to one or more embodiments described and illustrated herein.

Referring to both FIGS. 2 and 3, embodiments of the present disclosure provide PIC assemblies 100 comprising a PIC 140 having a shallow etched slot (e.g., 25-50 μm) and an optical fiber PIC connector interface 150 having a low-profile optical fiber 160. In the example of FIGS. 2 and 3, the PIC 140 is the same as the PIC 140 described with respect to FIGS. 1A-1C. However, the low-profile optical fiber 160 is a D-shaped optical fiber having at least one core 161 and a cladding that defines a flat surface 162 and a curved surface 166. Referring specifically to FIG. 3, an array of low-profile optical fibers 160 are disposed in a V-grooves 154 of a V-groove substrate 151. The V-groove substrate 151 also includes an end-surface 152, wherein end faces 164 of the low-profile optical fibers 160 may terminate proximate the end-surface 152 (e.g., either flush with the end-surface 152, or extending beyond the end-surface 152 by an offset distance).

The low-profile optical fibers 160 are aligned by the V-groove substrate 151 array and oriented such that their flat surfaces 162 are coplanar with the plane of the V-groove substrate 151. The orientation of the flat surfaces 162 are easy to determine via observation from the side or end of the low-profile optical fibers 160, whether the low-profile optical fibers 160 are stripped or not.

Figure 17B:
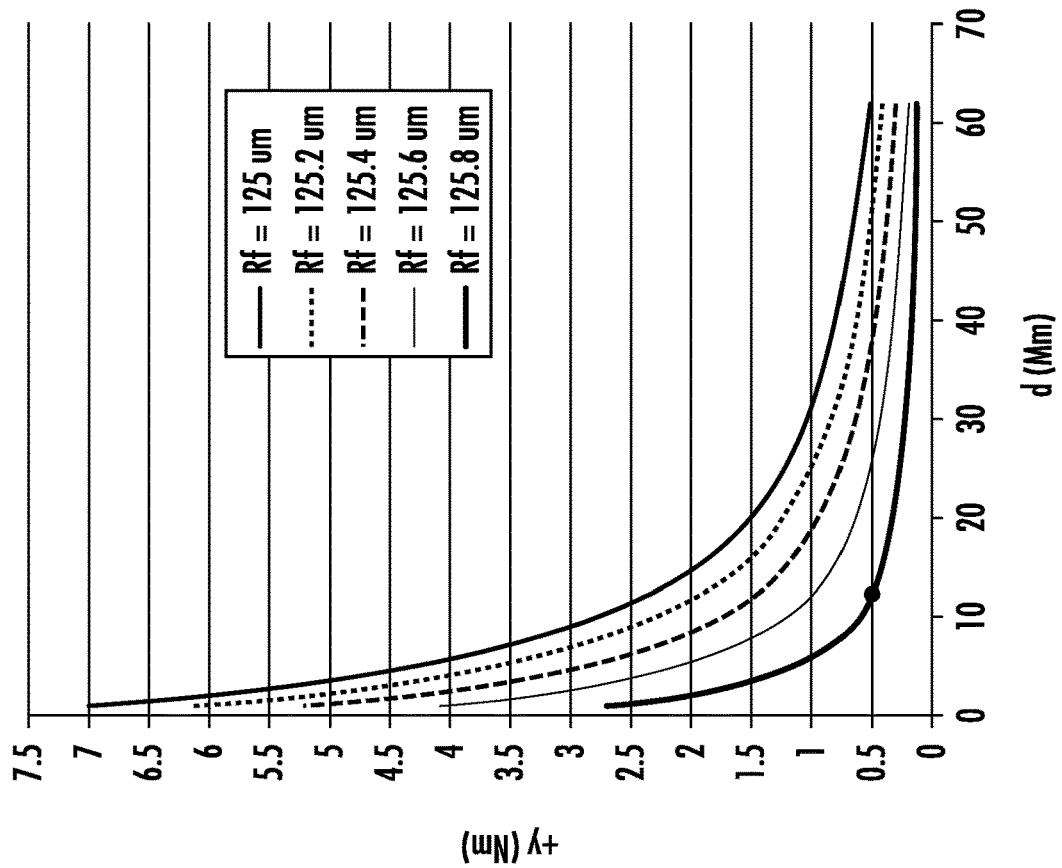
FIG. 17B is a graph that illustrates how the +y shift shown in FIG. 16 varies with d and $R_f$, with the dot highlighting a possible solution where d is smaller, but $R_f$ must be made large at 125.8 μm.

The D-shape of the low-profile optical fibers enables a distance $d_3$ between the center of the at least one core 161 and the flat surface 162 that is smaller than a distance between the core 161 and a curved surface (see FIG. 17). Thus, the D-shape of the low-profile optical fibers 160 enables the at least one core 161 to be closer to a mounting surface proximate the optical coupling edge 137 of the waveguide layer 130. Referring to FIG. 2, the distance $d_3$ between the core 161 and the flat surface 162 of the one or more low-profile optical fibers 160 is less than the depth $d_s$ of the edge slot 142, thereby eliminating or reducing the gap G as compared to FIG. 1C, and enabling the end face 18 of the one or more low-profile optical fibers 160 to be edge-coupled to the optical coupling edge 137 of the waveguide layer 130. Mechanical interference with the edge 144 of the waveguide substrate 141 is also avoided by ensuring that the vertical distance between the center of the core 161 and the flat surface 162 (e.g., 5-30 μm) is less than the vertical distance between the center of the waveguide 134 and the surface 147 of the edge slot 142 (e.g., 30-50 μm or less).

Thus, the embodiment of FIG. 3 enables shallow edge slots 142, thereby reducing manufacturing time and costs.

As described in more detail below with respect to FIGS. 19A-19J, embodiments are not limited to D-shaped fibers having a flat surface. The low-profile optical fibers described herein have an end face that is non-rotationally symmetric with respect to the at least one core 161, and have at least one minimum perimeter point that is a minimum distance from the at least one core as compared to remaining perimeter points of the cladding. The at least one minimum perimeter point may be defined by a single flat surface, such, as a D-shaped fiber, or more than one surface. The minimum perimeter point enables the at least one core to be closer to a mounting surface of the interconnect substrate than a traditional round optical fiber.

Figure 4:
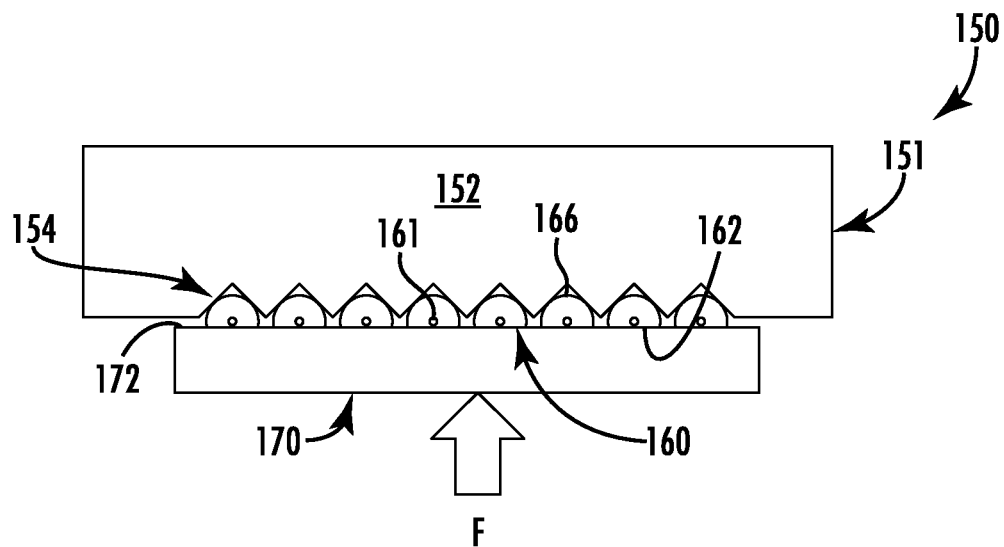
FIG. 4 schematically illustrates an example assembly process to assemble the optical fiber PIC connector interface shown in FIG. 3 according to one or more embodiments described and illustrated herein.

Referring to FIG. 4, the low-profile optical fibers 160 are disposed within the V-grooves 154 of the V-groove substrate 151 such that the curved surfaces 166 of the low-profile optical fibers 160 face the V-grooves 154 and the flat surfaces 162 generally face away from the V-groove substrate 151. Thus, each low-profile optical fiber 160 is rotated about its axis so that its flat surface 162 is oriented downward. An alignment substrate 170 having a planar alignment surface 172 may be brought into contact with the flat surfaces 162 of the low-profile optical fibers 160. A force F is applied to squeeze the low-profile optical fibers 160 between the V-groove substrate 151 and the alignment substrate 170. The flat, planar alignment surface 172 rotates the low-profile optical fibers 160 such that their flat surfaces 162 are in alignment and coplanar with the plane of the V-groove substrate. In principle, the flat surfaces 162 do not need to be precisely coplanar with the V-groove substrate plane prior to application of force, as the low-profile optical fibers 160 will tend to rotate about their axes to bring the flat surfaces 162 into alignment with the V-groove substrate plane. Adhesive may be applied to the low-profile optical fibers 160 and V-grooves 154 before or after the squeezing operation. Adhesive application can be localized to the V-groove surface and/or the facing low-profile optical fibers 160, using for example, spray application and/or local masking of the adhesive. Alternatively the adhesive can fill the gap between the V-groove substrate 151 and the alignment substrate 170.

Figure 5:
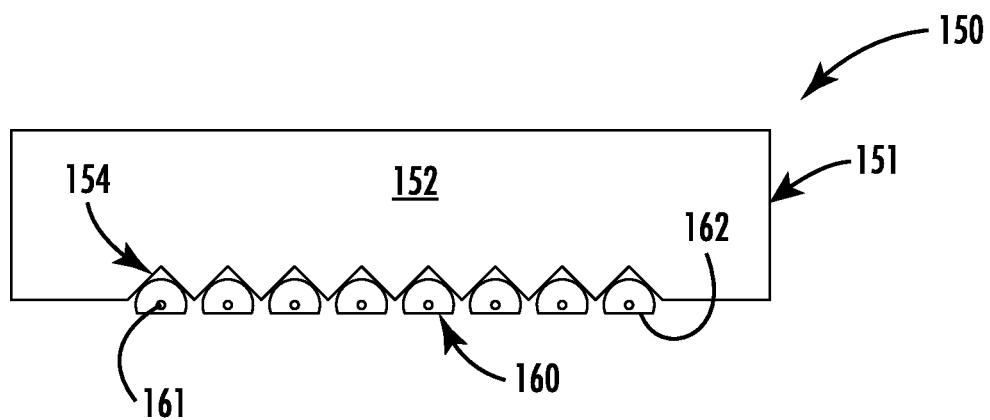
FIG. 5 schematically illustrates a front elevation view of the example optical fiber PIC connector interface illustrated by FIG. 3 according to one or more embodiments described and illustrated herein.

Referring now to FIG. 5, the alignment substrate 170 is removed from the low-profile optical fibers 160 and the V-groove substrate 151 after adhesive curing to reduce the vertical profile of the finished assembly. As an example and not a limitation, an intermediate release sheet or coating may be provided on the planar alignment surface 172 that does not bond to the adhesive (e.g., a PTFE or elastomeric film), thereby enabling easy separation of the alignment substrate 170 from the V-groove substrate 151. In some embodiments, the alignment substrate 170 may remain on the V-groove substrate 151 and be a permanent component of the assembly.

The low profile PIC interfacing applications involve an optical fiber link that typically extends a short distance. For a PIC 140 to a fiber array unit that is adjacent to the PIC 140, the link length may be, without limitation, 1-4 cm. As another example, for a PIC interface to a board level fiber jumper, the link provided by the low-profile optical fibers 160 extends from the PIC 140 (which could be in the middle of tire support substrate 145 (e.g., a PCB)) to a fiber array bulkhead adapter located at the perimeter of the support substrate. In this case, the optical fiber link length may be, without limitation, 10-100 cm.

Figure 6:
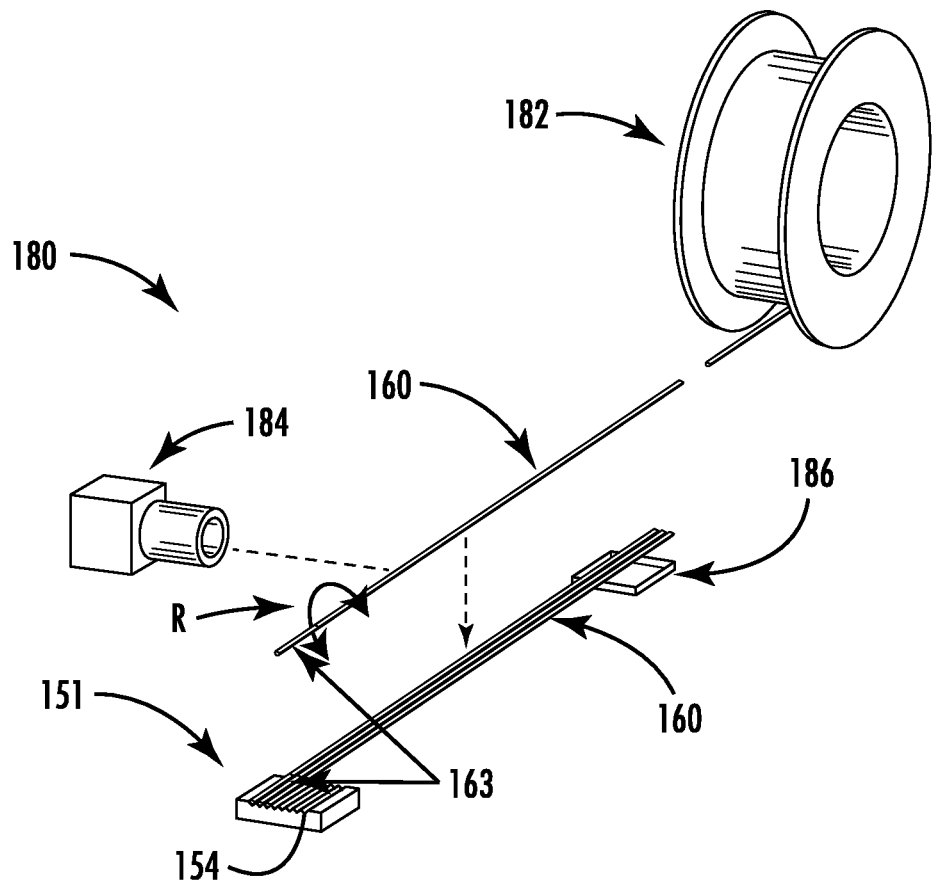
FIG. 6 schematically illustrates a process for populating a V-groove substrate of the optical fiber PIC connector interface illustrated by FIG. 3 according to one or more embodiments described and illustrated herein.

The V-groove substrates 151 described herein may be populated using a set of individual low-profile optical fibers 160 or an array of low-profile optical fibers 160 grouped in a fiber ribbon. FIG. 6 illustrates an example bench 180 for rotation of individual low-profile optical fibers 160 and insertion into V-grooves 154 of a V-groove substrate 151. The low-profile optical fibers 160 is drawn from a spool 182 and cut to the desired optical link length (e.g., 1-100 cm). One end 163 of the low-profile optical fiber 160 is stripped a short distance from tire end (e.g., 3-5 mm) to prepare it for insertion into the V-groove 154. A camera 184 may observe the low-profile optical fiber 160 from the side while a fiber rotation system rotates the fiber about its axis (see arrow R). Experiments show that it is easy to visually determine the orientation of the low-profile optical fiber 160, even if the fiber is coated. When the flat surface 162 of the low-profile optical fiber 160 is oriented properly, its bare end 163 is lowered down into the next available V-groove 154 on the V-groove substrate 151.

A temporary retention plate or gripper (not shown) may hold the bare low-profile optical fiber 160 in position on the V-groove 154 until all low-profile optical fibers 160 are positioned in the V-grooves 154. The opposite end of the low-profile optical fiber 160 is lowered down onto an adhesive pad 186 that manages the fiber array in a group in preparation for subsequent connectorization of this end of the optical link.

An advantage of the assembly approach illustrated by FIG. 6 is that it produces a fiber array that is not ribbonized along the its length, providing more flexibility in board-level deployment (unlike a fibber ribbon, which resists bending in certain directions due to its non-circular cross section).

Figure 7:
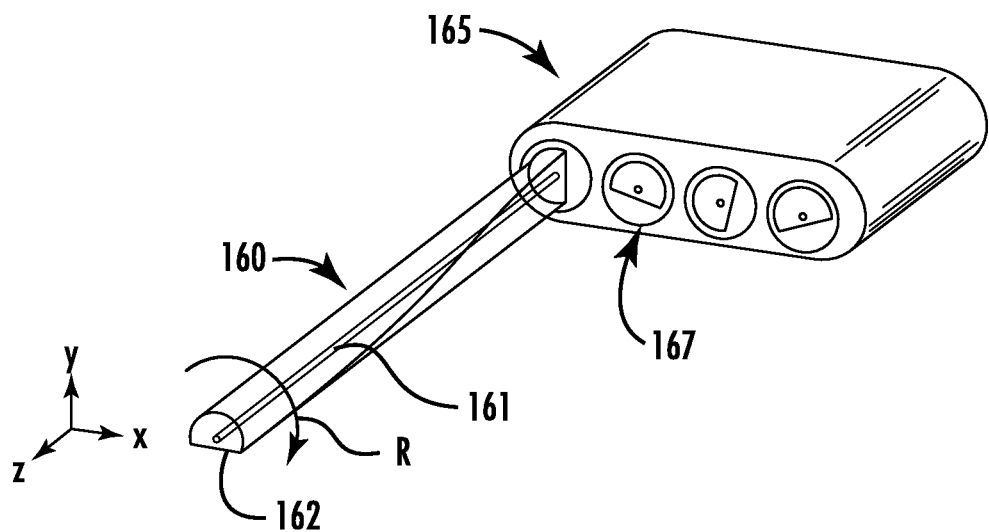
FIG. 7 schematically illustrates a perspective view of a ribbonized low-profile optical fiber array according to one or more embodiments described and illustrated herein.

Low profile PIC interfaces can also be assembled using ribbonized low-profile optical fibers 160. As shown in FIG. 7, the low-profile optical fibers 160 are expected to have random rotational orientations within a jacket 165 moving across the array, so that their flat surfaces 162 are not necessarily coplanar with a V-groove substrate. In the worst case, the flat surface 162 is oriented 180° away from the desired orientation. However, using the imaging techniques described above with respect to FIG. 6, it is possible to assemble low-profile optical fiber ribbons (e.g., D-shaped optical fiber ribbons) where each fiber is rotated prior to ribbonization so that all flat surfaces 162 are coplanar.

Each low-profile optical fiber 160 may be individually rotated about its axis (as shown by arrow R) so that its flat surface 162 is properly aligned in the V-groove substrate 151 (not shown in FIG. 7). If this rotation is applied along a sufficiently long length of fiber, the resulting fiber torsional stresses are acceptable for long term reliability. For SMF-28 manufactured by Corning, Inc. of Corning, N.Y., the twist limit is three foil turns per meter. Tills corresponds to a 180° twist in 16.6 mm, resulting in an estimated 37.2 MPa shear stress in the fiber.

The assembly process involves separating the low-profile optical fibers 160 from the fiber ribbon matrix (but preferably leaving the coating 167 on the D-fibers), rotating individual low-profile optical fibers 160 and then locking them in place at the end (by, for example, immediately constraining them in V-grooves 154). After rotation, the individual low-profile optical fibers 160 can be retained in place using adhesive overcoating.

While the required minimum fiber twisting length (16.6 mm) is sufficiently short for most low profile PIC interconnection applications, the fiber twisting may also induce off-axis warp/bending and unwanted optical birefringence. Therefore it may be preferable to minimize these negative effects by twisting the fiber over longer lengths.

Figure 8:
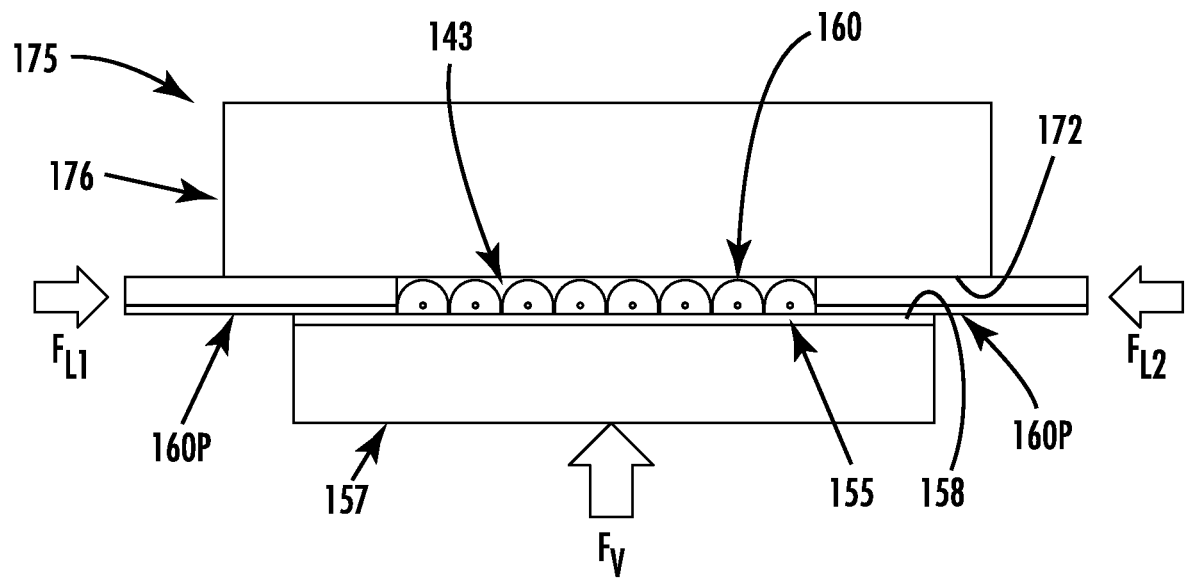
FIG. 8 schematically illustrates another example assembly process to assemble an optical fiber PIC connector interface according to one or more embodiments described and illustrated herein.

The optical fiber assembly may be assembled by other processes that do not utilize a V-groove substrate. Referring now to FIG. 8, an alternative approach for aligning low-profile optical fibers 160 comprises a fiber array squeeze sandwich, assembly 175, which includes a cover substrate 176 having a flat surface 172 and an alignment substrate 157 having a flat alignment surface 158. The cover substrate 176 may be made of a material having a coefficient of thermal expansion that is close to that of the waveguide substrate 141 and waveguide layer 130. As an non-limiting example, the cover substrate 176 may be fabricated from glass. The flat surfaces 162 of the low-profile optical fibers 160 are disposed on a release coating or film 155 present on the flat alignment surface 158. All low-profile optical fibers 160 in the squeeze sandwich assembly 175 may be rotationally oriented following the techniques described in the previous section.

The cover substrate 176 is positioned on the curved surfaces of the low-profile optical fibers 160. An adhesive 143 is provided between the low-profile optical fibers 160 and the cover substrate 176. The squeeze sandwich assembly 175 process is implemented using one or more pairs of pusher fibers 160P that may also be D-shaped optical fibers.

Figure 9A:
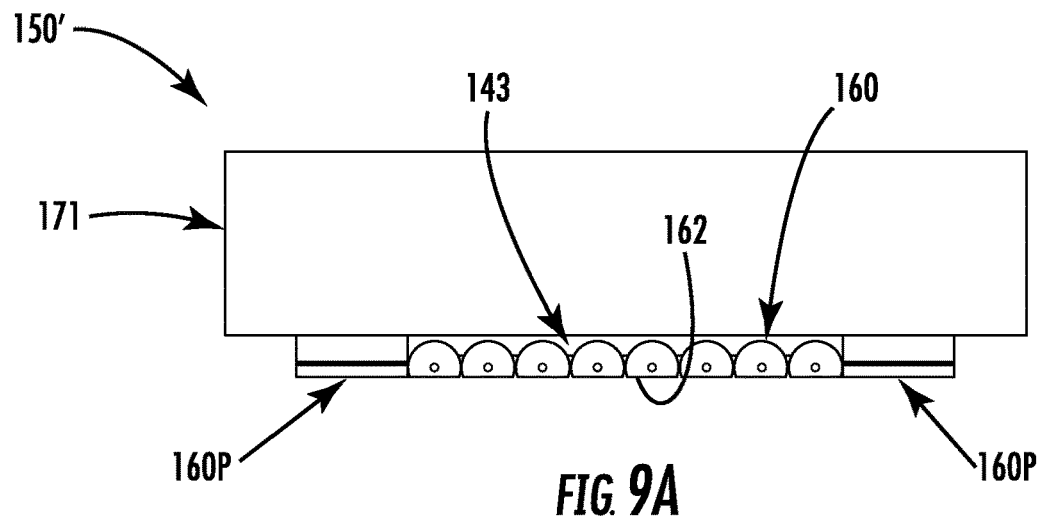
FIG. 9A schematically illustrates another example optical fiber PIC connector interface according to one or more embodiments described and illustrated herein.

Referring to FIG. 9A, after UV adhesive curing, the alignment substrate 157 is removed from the array of low-profile optical fibers 160. Excessive lengths of pusher fibers 160P extending beyond the cover substrate 176 are also removed. An ad vantage of the squeeze sandwich assembly approach is that it eliminates the need for an expensive V-groove substrate for fiber alignment that goes into each fabricated part.

Figure 9B:
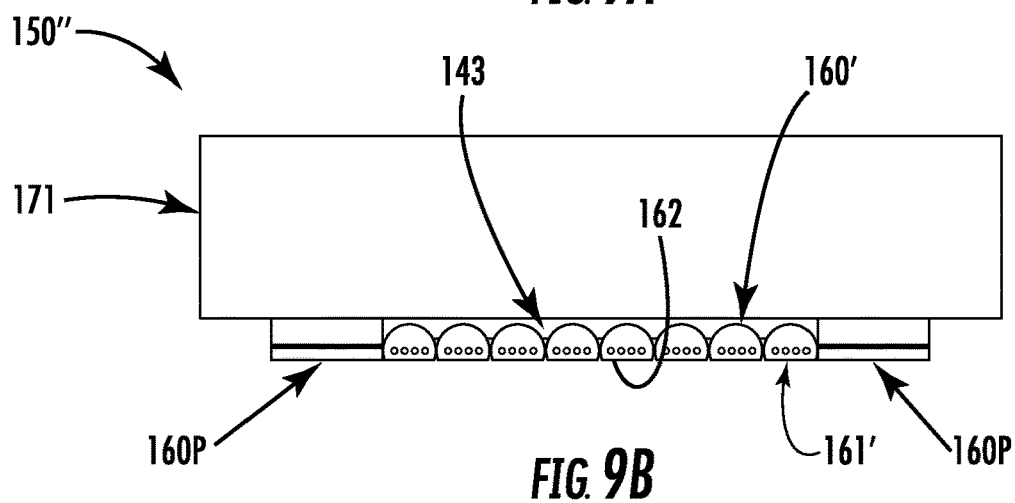
FIG. 9B schematically illustrates another example optical fiber PIC connector interface wherein each low-profile optical fiber comprises a plurality of cores according to one or more embodiments described and illustrated herein FIG. 10 schematically illustrates a side view of an example PIC assembly according to one or more embodiments described and illustrated herein.

FIG. 9A illustrates an example wherein each low-profile optical fiber 160 is a single core optical fiber. However, embodiments are not limited thereto. Any of the embodiments described herein may utilize multi-core optical fibers, such as the multi-core low-profile optical fiber 160' depicted by FIG. 9B. In the example of FIG. 9B, the multi-core low-profile optical fiber 160' comprises a plurality of cores 161' arranged in a one-row array of four cores 161'. It should be understood that more or fewer cores may be used, and that the cores may be arranged in more than one row, for example.

Figure 10:
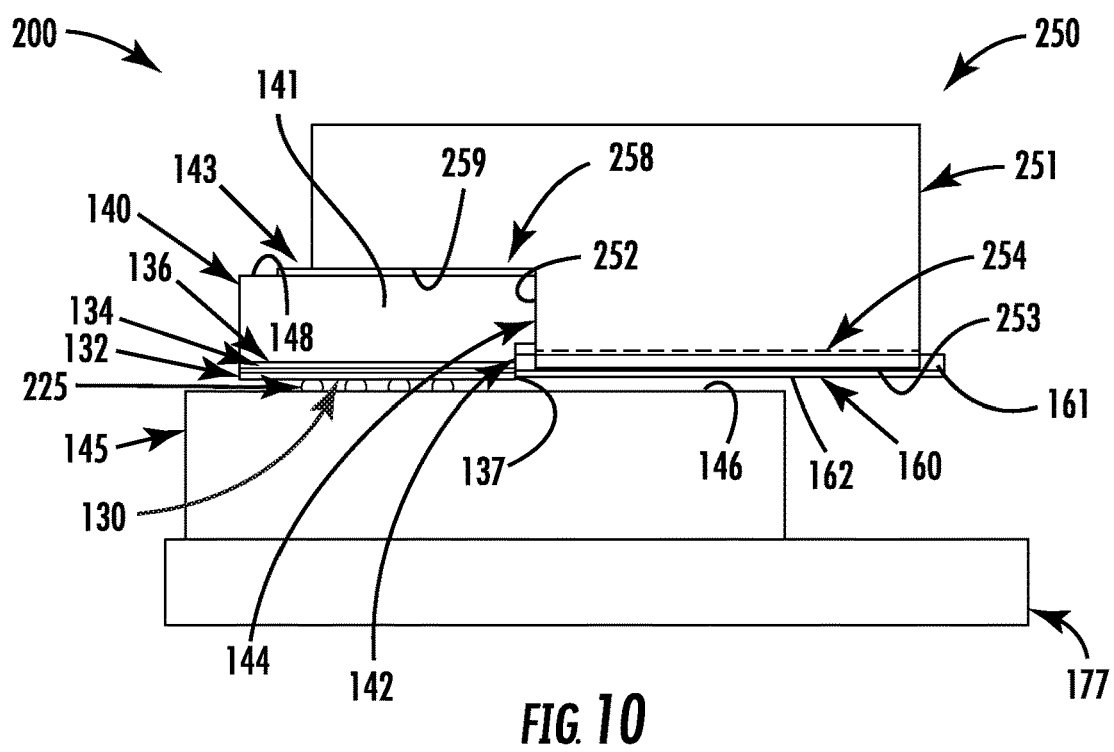

FIG. 10 illustrates another PIC assembly 200 comprising a PIC 140 that is flip-chip mounted on a support substrate 145 configured as a module substrate, which is further mounted on a base substrate 177, such as a printed circuit board. Other mounting configurations are also possible. The PIC assembly 200 of FIG. 10 further comprises an optical fiber PIC connector interface 250 comprising an interconnect substrate 251 and one or more low-profile optical fibers 160.

The interconnect substrate 251 comprises a fiber mounting surface 253, a mechanical coupling surface 252, and an upper support surface 259. The fiber mounting surface 253 may include one or more V-grooves 254 as shown in FIG. 10, or it may be a flat, planar surface in other embodiments. The flat surface 162 of the one or more low-profile optical fibers 160 is coplanar with the fiber mounting surface. The curved surfaces of the one or more low-profile optical fibers 160 are disposed within the V-grooves 254.

The mechanical coupling surface 252 is transverse to the fiber mounting surface 253 and the upper support surface 259. The upper support surface 259 extends from the mechanical coupling surface 252 such that a notch 258 is defined within the interconnect substrate 251.

The interconnect substrate 251 may be made of a material having a coefficient of thermal expansion similar to that of the waveguide substrate 141 and the waveguide layer 130. As a non-limiting example, the interconnect substrate 251 may be fabricated from glass.

The flip-chip mounting arrangement produces a very small vertical clearance (e.g., 20-40 μm) between the center of the core of the waveguide 134 and the support surface 146 of the support substrate 145. Use of low-profile optical fibers 160, such as D-shaped optical fibers, enables vertical clearance for optical interconnections to such PIC waveguides when the assemblies are flip-chip mounted. Tire low-profile optical fiber approach is applicable to PIC substrates with or without the perimeter etched edge slot 142.

In the example of FIG. 10, the interconnect substrate 251 is notched (by notch 258) so that it may be bonded onto the top surface 148 of the waveguide substrate 141 (i.e., the surface of the waveguide substrate that is opposite from the waveguide layer 130) using adhesive 143. Adhesive may also be applied to the edge 144 of the waveguide substrate and the mechanical coupling surface 252 to bond these two surfaces together. The large bond areas and the coefficient of thermal expansion match of the interconnect substrate 251 to the waveguide substrate 141 ensures a robust mechanical bond between components. In embodiments where an etched slot 242 is provided within the waveguide substrate 141, the ends of the low-profile optical fibers 160 may extend beyond the mechanical coupling surface 252 by some distance (e.g., 100-150 μm) so that they reside within the slot 142 and the end faces are as close as possible to the optical coupling edge 137 of the waveguide layer 130.

Figure 11A:
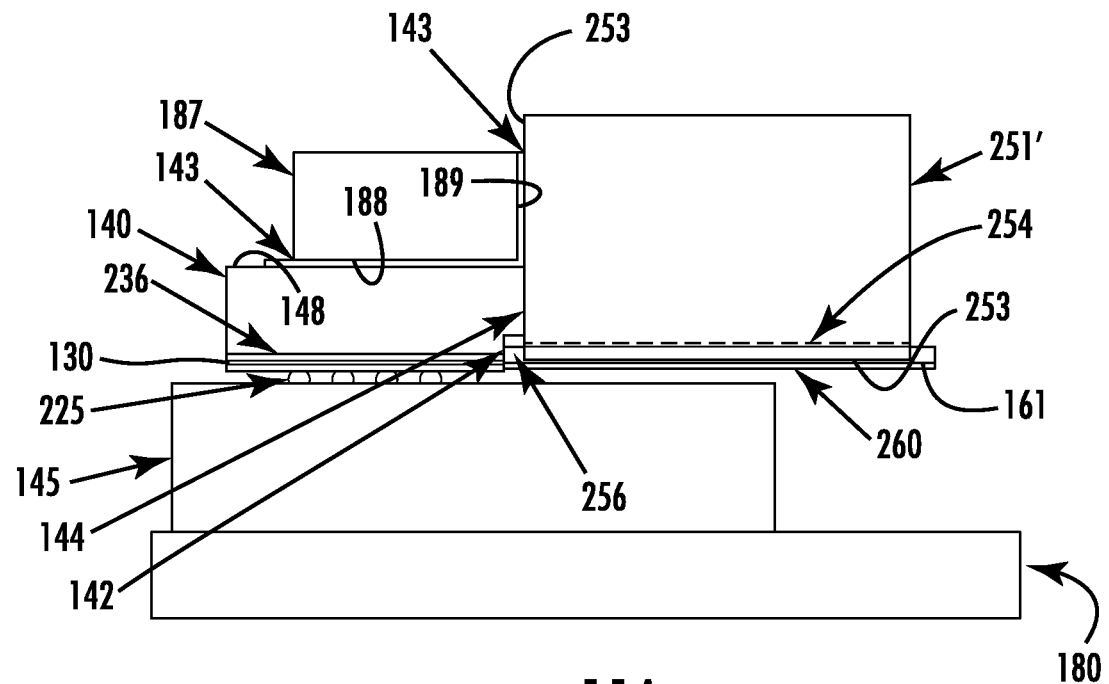
FIG. 11A schematically illustrates a side view of another example PIC assembly according to one or more embodiments described and illustrated herein.

FIG. 11A illustrates another embodiment wherein the interconnect substrate 251' is square without a notch, and the large bonding area between it and the PIC 140 is provided by an intermediate block 187 that is positioned onto the top surface 148 of the waveguide substrate 141. The intermediate block 187 has a first surface 188 that is bonded to the top surface 148 of the waveguide substrate 141 by adhesive 143 and a second surface 189 that is bonded to a mechanical coupling surface 253 of the interconnect substrate 251'.

In the embodiment of FIG. 11A, the interconnect substrate 251' further includes a projection 256 that extends from the mechanical coupling surface 253 such that it extends into the edge slot 142 of the waveguide substrate 141. It should be understood that any of the embodiments described herein may include a similar projection 256 for supporting the low-profile optical fibers 160 within the edge slot 142.

Figure 11B:
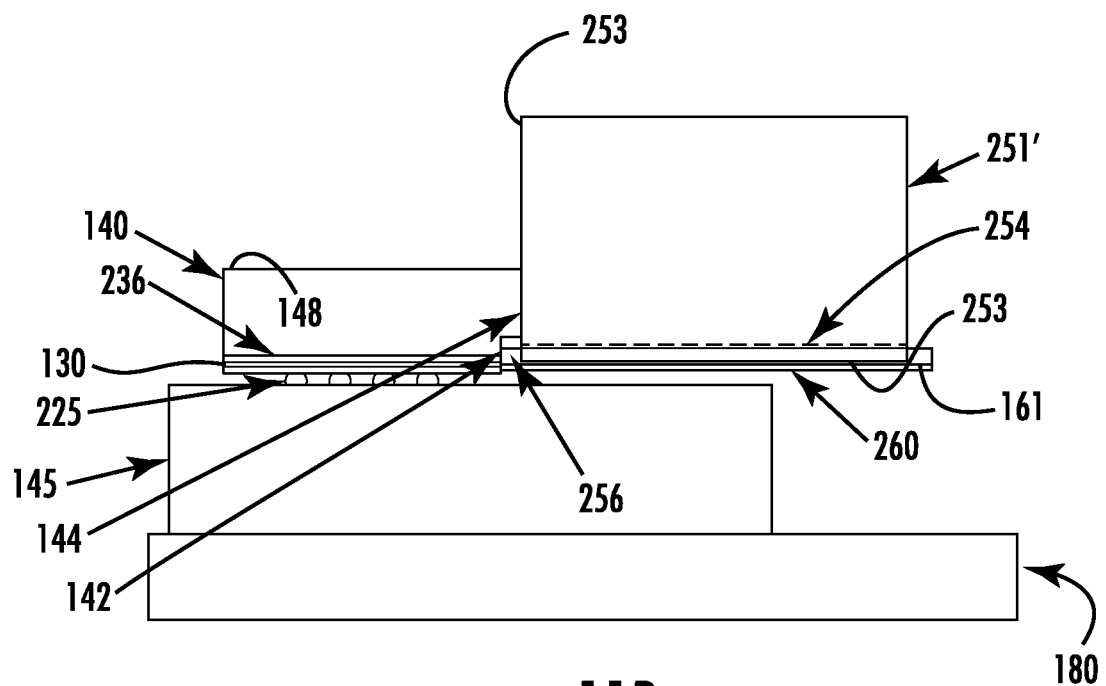
FIG. 11B schematically illustrates a side view of another example PIC assembly according to one or more embodiments described and illustrated herein.

FIG. 11B illustrates another embodiment wherein the interconnect substrate 251' does not include a notch in a manner similar to the embodiment of FIG. 11A. However, in the embodiment of FIG. 11B, an intermediate block 187 is not provided. Rather, the edge 144 of the waveguide substrate 141 is coupled only to the mechanical coupling surface 253 of the interconnect substrate 251', such as by an adhesive.

Figure 11C:
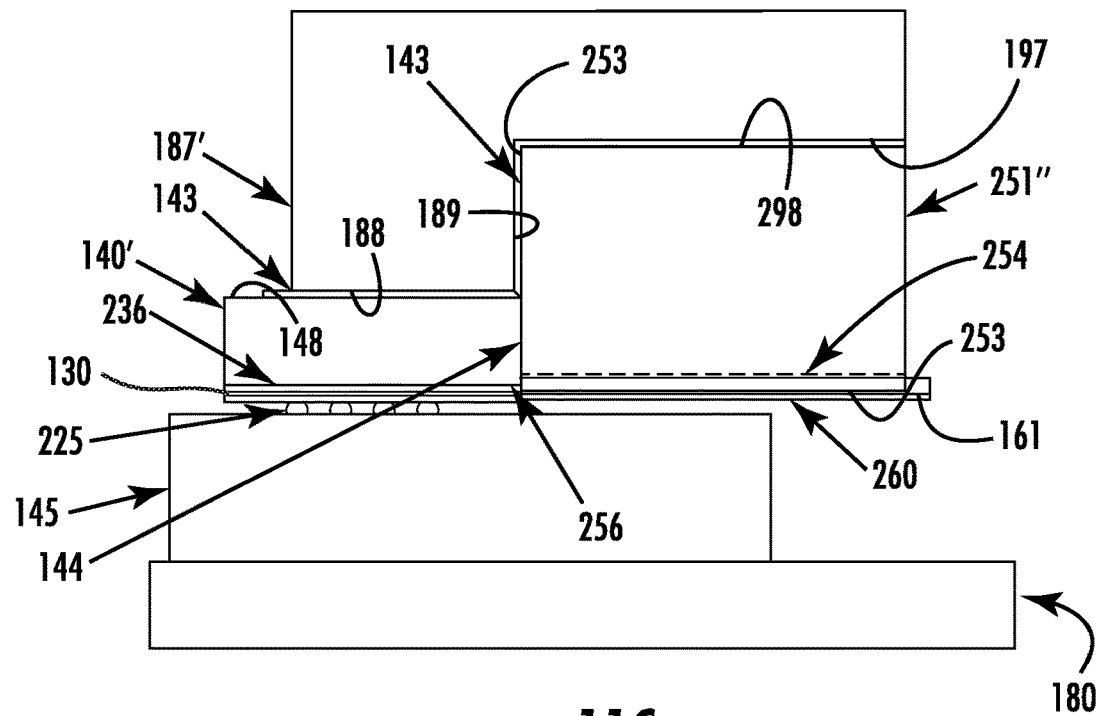
FIG. 11C schematically illustrates a side view of another example PIC assembly according to one or more embodiments described and illustrated herein.

In some embodiments, the PIC 140 may not include an edge slot 142. Referring now to the example of FIG. 11C, the PIC 140' has a straight edge 144 that does not include an edge slot as described above. Because the PIC 140' does not include an edge slot, the interconnect substrate 251" of FIG. 11C does not include a projection 251 as depicted by FIGS. 11A and 11B. Thus, the interconnect substrate 251" of FIG. 11C may provide for easier access to the end faces of the low-profile optical fibers 260 for cleaving an end face polishing. The example of FIG. 11C further includes an intermediate block 187' having an L-shape in cross-section. The example intermediate block 187' has a first surface 188 that is bonded to the top surface 148 of the waveguide substrate 141, a second surface 189 that is bonded to a mechanical coupling surface 253 of the interconnect substrate 251", and a third surface 197 that is bonded to an upper surface 298 of the interconnect substrate 251" by adhesive 143. The intermediate block 187" may provide for a more robust mechanical connection between the interconnect substrate 251" and the PIC 140'. However, similar to the example of FIG. 11B, the assembly of FIG. 11C may not include an intermediate block 187".

Figure 12:
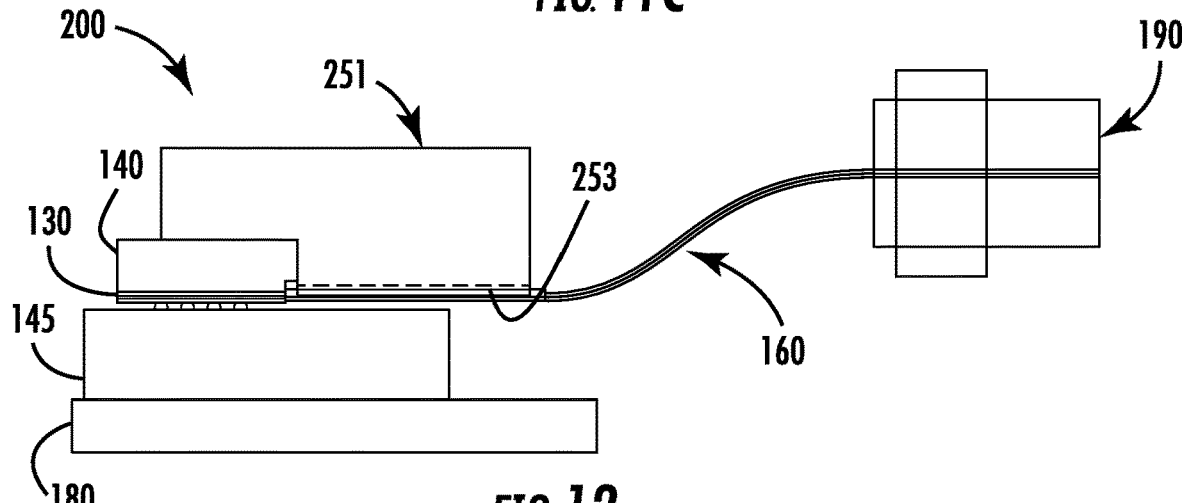
FIG. 12 schematically illustrates a side view of the example PIC assembly of FIG. 10 with an optical connector attached to a second end of an array of low-profile optical fibers according to one or more embodiments described and illustrated herein.

Referring to FIG. 12, in any of the embodiments described herein, the end of the fiber link provided the low-profile optical fibers 160 opposite from the PIC 140 (i.e., a second end) may include an optical connector 190 (e.g., an MT ferrule that will be inserted into an MPT connector). The optical connector 190 can be far from the PIC 140 using long length of low-profile optical fibers 160 as shown in FIG. 12, or directly attached to the interconnect substrate 251.

Figure 13:
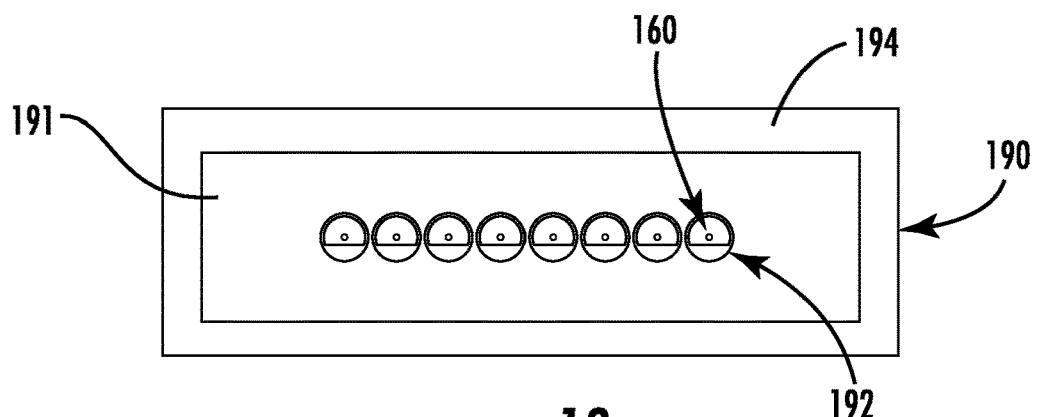
FIG. 13 schematically illustrates a front elevation view of an optical connector and an array of low-profile optical fibers according to one or more embodiments described and illustrated herein.

If the fiber link is short, there is expected to be a correlation between the rotational orientation of the low-profile optical fibers 160 on the interconnect substrate 251 and the in the optical connector 190. FIG. 13 provides an example end face view of an array of low-profile optical fibers 160 within an optical connector 190 comprising a ferrule 191 (e.g., an MT ferrule) and a housing 194, with the flat surfaces 162 in an orientation that corresponds with the orientation of the low-profile optical fibers 160 within the interconnect substrate 251.

A problem with passive alignment of low-profile optical fibers 160 in ferrules (i.e., ferrules of connectors) is that they do not self-center in the ferrule bores 192 due to the elimination of fiber cladding material over the flat surface 162. Tire low-profile optical fibers 160 are well-constrained in the direction parallel to the flat surface 162 and perpendicular to the fiber axis, and poorly constrained in the direction perpendicular to the flat surface 162.

One solution for using low-profile optical fibers 160 in standard ferrules of optical connectors 190 (designed for standard 125 μm outer-diameter optical fibers) is to provide a mechanical bias force on the flat surface 162 of the array of low-profile optical fibers 160 that drives their opposite round clad surfaces into contact with the ferrule inner-diameter surfaces. If the low-profile optical fibers 160 are properly oriented in ferrule bores 192 (i.e., with their flat surfaces 162 all rotationally oriented so that they are approximately coplanar), the low-profile optical fibers 160 can be aligned in the ferrule 191 using an external force $F_v$ from the bottom. Force $F_v$ applied simultaneously on all the flat surface 162 causes tire low-profile optical fibers 160 to be biased upwards, ensuring that they are properly aligned in the ferrule bore 192.

Figure 14A:
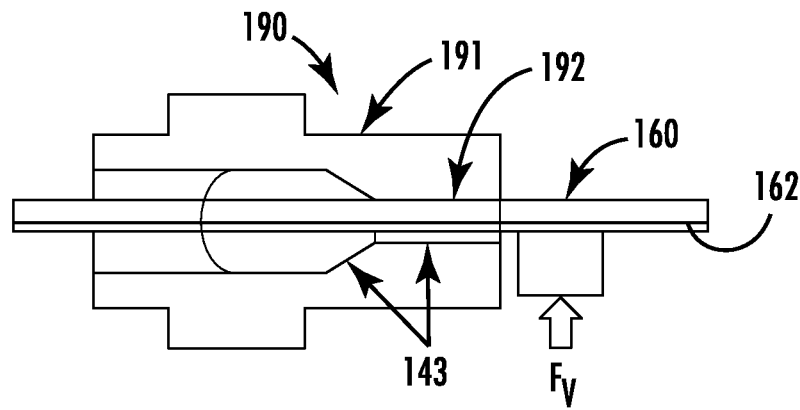
FIG. 14A schematically illustrates a cross-section view of the optical connector and the array of low-profile optical fibers illustrated by FIG. 13 according to one or more embodiments described and illustrated herein.
Figure 14B:
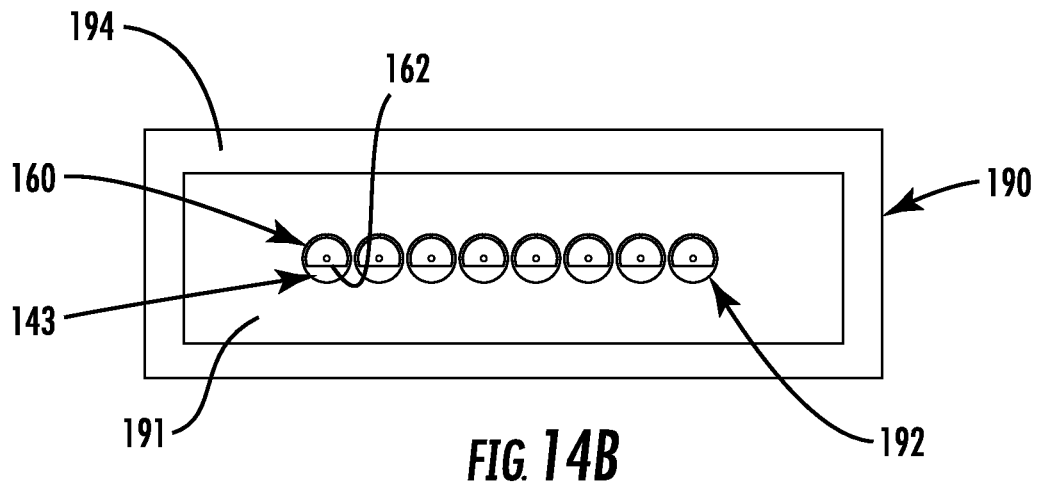
FIG. 14B schematically illustrates a front elevation view of the optical connector and the array of low-profile optical fibers illustrated by FIG. 13 with adhesive disposed within bore holes of the optical connector according to one or more embodiments described and illustrated herein.

UV curable adhesive 143 around the low-profile optical fibers 160 and within a void between the flat surfaces 162 and an interior surface of the ferrule bores 192 is exposed to light to fix the low-profile optical fibers 160 in place. FIG. 14B shows an end face view of the optical connector 190 after assembly. In some cases, the UV curable adhesive 143 could expand slightly on curing to force the fibers into position.

Figure 15:
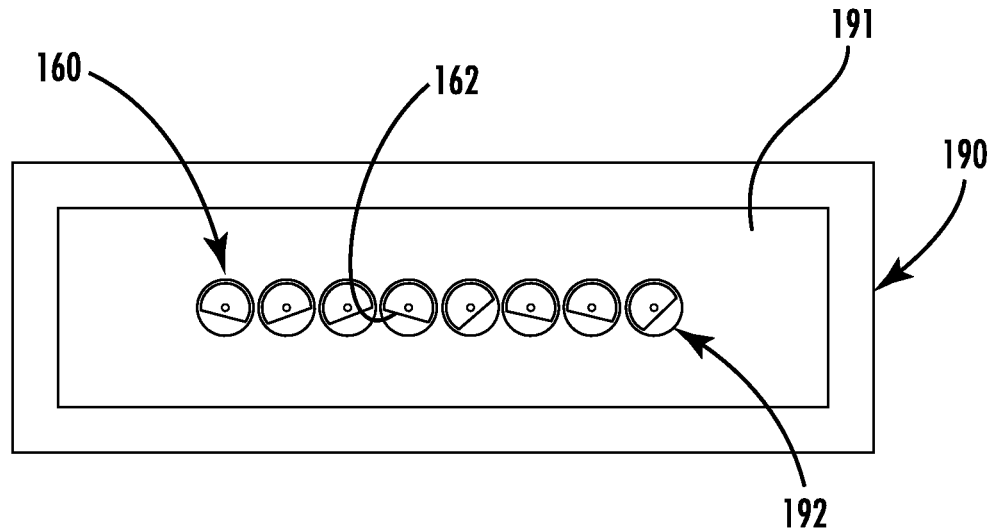
FIG. 15 schematically illustrates a front elevation view of an optical connector and an array of low-profile optical fibers wherein the flat surfaces of the low-profile optical fibers are not coplanar with one another.

In some embodiments, the low-profile optical fiber 160 is designed to minimize lateral misalignment on insertion into ferrule bores 192. This may be important for longer length links where the low-profile optical fiber 160 may not maintain its orientation moving from the interconnect substrate 251 to the optical connector 190. FIG. 15 shows lack of correlation of the rotational orientation of the low-profile optical fibers 160 in the ferrule 191 for a longer fiber link. It may also desirable for short links to avoid the need to mechanically bias the low-profile optical fiber 160 in the ferrule 191 as described above.

Figure 16:
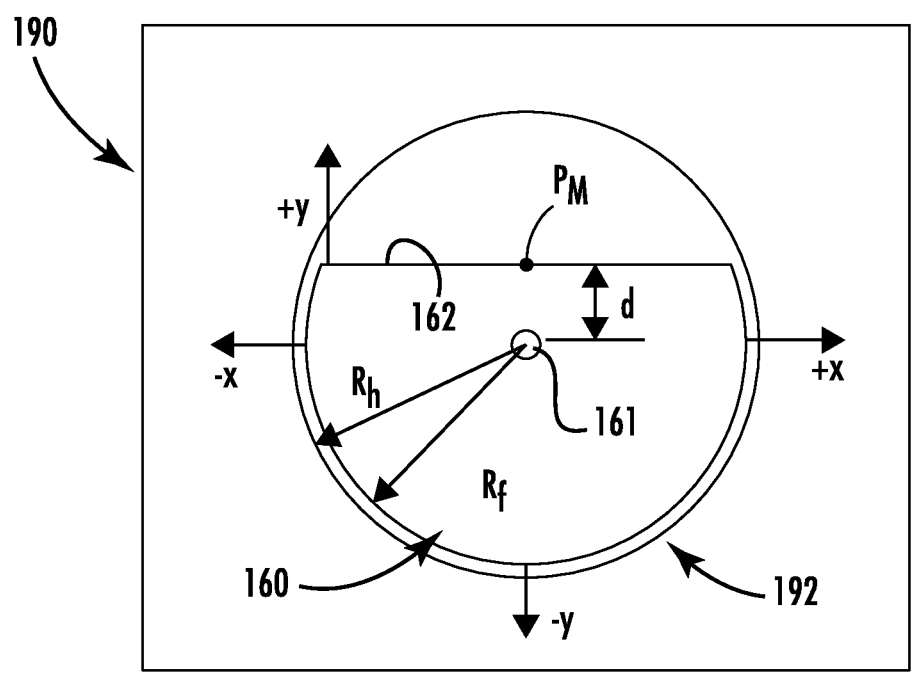
FIG. 16 schematically illustrates a close-up front view of a low-profile optical fiber within a bore of a ferrule of an optical connector according to one or more embodiments described and illustrated herein.

FIG. 16 shows a low-profile optical fiber 160 configured as a D-fiber in a ferrule bore 192 where:
  $R_f$ is the radius of the fiber in its non-flat regions (around 125 μm);
  $R_h$ is the radius of the hole (slightly larger than 125 μm, such as 126 μm); and
  d is the distance between the center of the ferrule bore 192 and the flat surface 162 (e.g., somewhere between about 5 μm and about 62.5 μm) (i.e., a distance from, the minimum, perimeter point $P_M$ to the core 161).

The low-profile optical fiber 160 can experience lateral shifts in four directions: +x, −x, +y, −y. It may be desirable that at all times the values for +x, −x, +y, −y are less than about 0.5 μm for low lost coupling of single mode fibers by the ferrule 191. For three of these directions, the possible shift away from perfect fiber alignment in the center for the ferrule is small: $(R_h - R_f)$. However, the +y shift will always dominate lateral misalignment of the core in the ferrule 191, so it is the focus of modeling discussed below.

A simulation of the magnitude of the +y lateral shift was performed. For the simulation, the ferrule hole diameter $R_h$ was assumed to be 126 μm. The +y shift was plotted against the distance from the flat to the core center d. A family of curves was plotted showing the value of +y for various D-fiber diameter $R_f$ from 125.0 μm to 125.8 μm.

Figure 17A:
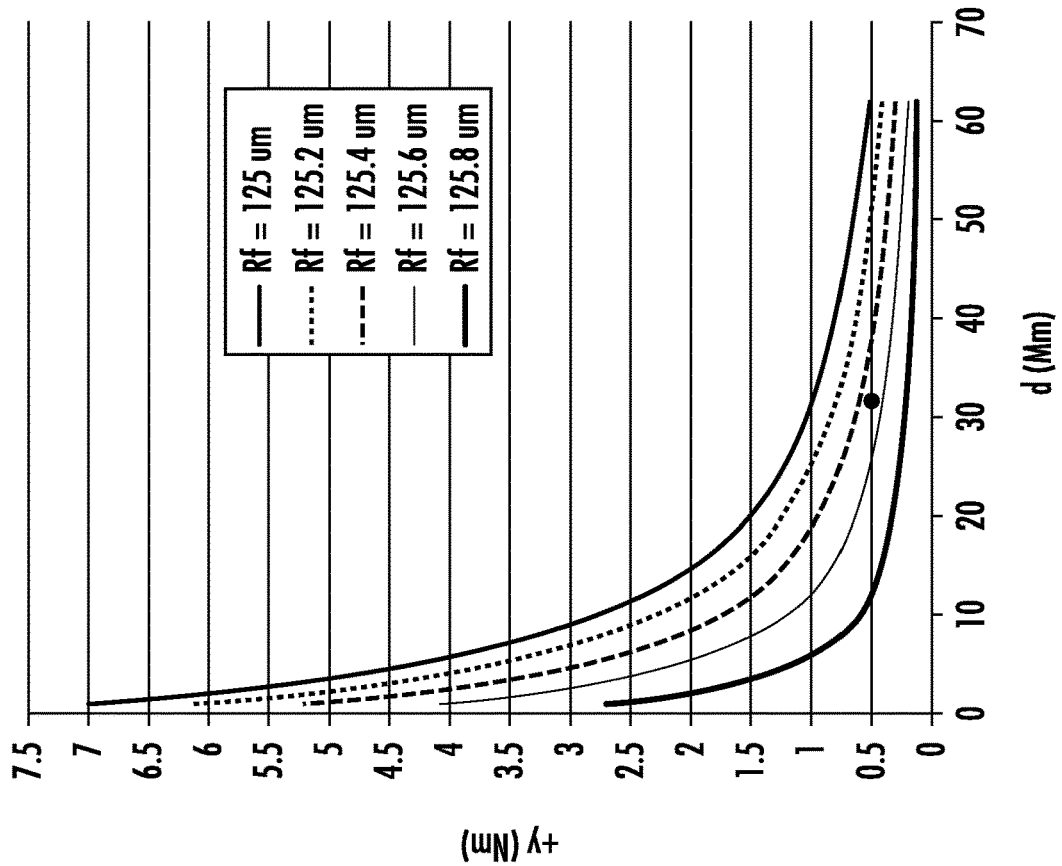
FIG. 17A is a graph that illustrates how the +y shift shown in FIG. 16 varies with d and $R_f$.

The simulation results are plotted in FIG. 17A. For a reasonably toleranced fiber diameter (e.g., 125.5 μm) a maximum 0.5 μm value for +y shift corresponds to a flat-to-core center d value of around 32 μm (dot shown on the plot). This value for d is practical in that it is in the neighborhood of typical PIC waveguide to support substrate vertical offsets.

If smaller d values are required, the plot of FIG. 17A shows that it will come at the expense of increasing tire diameter of the low-profile optical fiber 160 closer to 126 μm. The dot in FIG. 17B highlights a potential solution where d is 12 μm, but $R_f$ is 128.8 μm. Depending on tolerances for the ferrule hole, this may or may not be practical.

Figure 18:
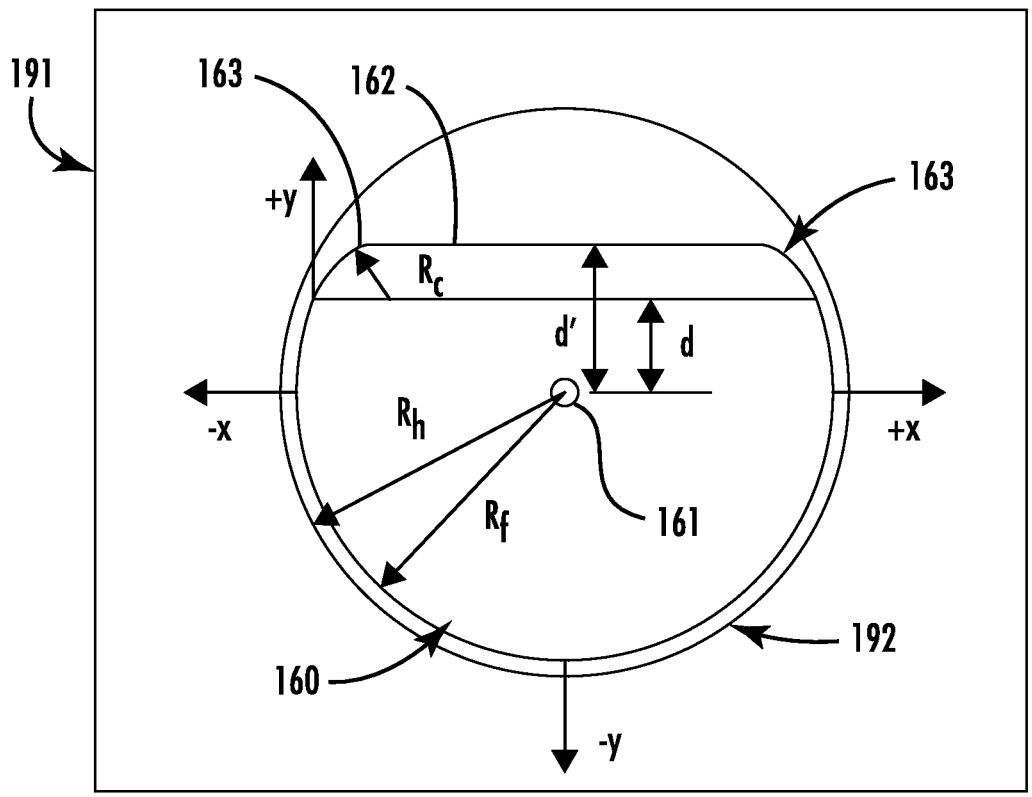
FIG. 18 schematically illustrates a close-up front view of a low-profile optical fiber within a bore of a ferrule of an optical connector according to one or more embodiments described and illustrated herein.

In general, larger flat-to-core center distances (e.g., d>10-15 μm) may be preferable to limit unwanted evanescent coupling out of waveguide and into the polymer coating of the low-profile optical fiber, especially in configurations where the fiber is bent away from the flat surface. Referring to FIG. 18, in a practical fiber there would be some small radius $R_c$ where the cladding flat and curved surfaces meet. To maintain the same +y shift value the core-to-flat distance d' would be equal to $d + R_c d / R_f$. For d=30 μm and standard 125 μm diameter SMF fiber d'≈$d + R_c/2$.

Figures 19A, 19B:
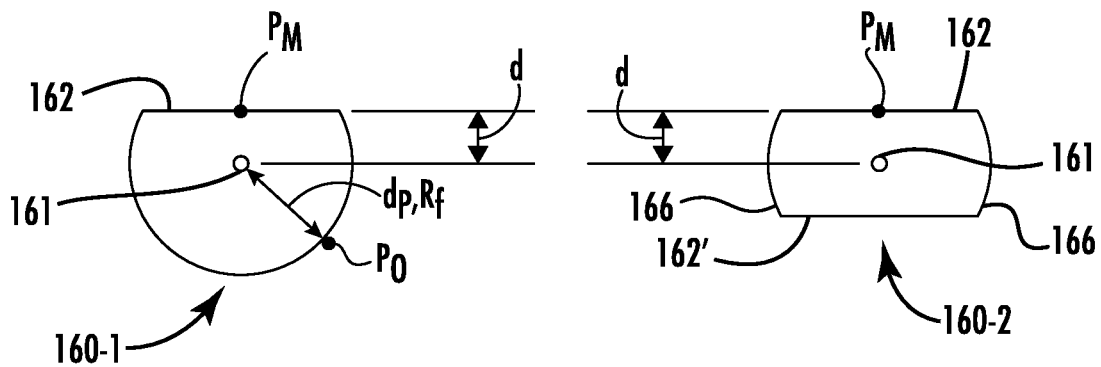
FIG. 19A schematically illustrates a close-up end view of a low-profile optical fiber configured as a D-shaped optical fiber according to one or more embodiments described and illustrated herein.
FIG. 19B schematically illustrates a close-up end view of a low-profile optical fiber configured as a flat optical fiber according to one or more embodiments described and illustrated herein.

Because a D-shaped fiber has a smaller diameter measured from the flat face across the core to the opposite cladding surface, it should be able to be bent reliably through smaller radius bends, enabling more compact designs. FIG. 19A illustrates an end face of a D-shaped low-profile optical fiber 160-1, wherein a minimum perimeter point P of the cladding is on a flat surface 162 defining a plane. As shown by FIG. 19A, minimum perimeter point P is at a minimum distance d from the core, as compared to other perimeter points, such as point $P_O$, which is at a distance $d_P$ that is defined by the radius $R_f$ of the low-profile optical fiber 160-1.

Fiber S-bends may be employed in photonic components involving optical fibers to accommodate different material coefficients of thermal expansion, and the need to route fibers through complex geometries. For example, the PIC assembly 200 shown in FIG. 12 uses a fiber S-bend to bring the low-profile optical fiber 160 fiber up from the plane of the fiber mounting surface 253 of the interconnect substrate 251 to the central axis of the ferrule 191.

However, bending a D-shaped fiber as shown in FIG. 19A will cause the neutral bending stress plane to not pass through the fiber core, possibly inducing stress birefringence that may cause optical loss. To accommodate this, in some embodiments the low-profile optical fibers may be fabricated with a flat surface on both the top surface (flat surface 162) and the bottom surface (flat surface 162') resulting in a flat fiber 160-2 as shown in FIG. 19B that is even thinner than a D-shaped optical fiber.

The low-profile optical fiber 160-2 of FIG. 19B provides a number of advantages. It may enable even tighter bends while ensuring that the neutral bending stress plane passes through the core of the fiber. The flat fiber would have similar lateral misalignment characteristics to the D-shaped fiber for comparable core-to-plane offset distances d. Further, tire flat fiber may also be easier to align when using squeeze sandwich assembly described above. Additionally, the flat surface 162 enables a shallow edge slot 142 in the waveguide substrate 141, while the bottom flat surface 162' enables low profile connections to the PIC 140. The slot depth $d_e$ could be well controlled so that the flat optical fiber core could be passively aligned to the waveguide 134 of the waveguide layer 130. The depth of the edge slot 142 may be controlled more accurately for etching a shallow trench (e.g., 20-30 μm) than a deep trench normally required for a standard fiber (e.g., 62.5 μm).

Figure 19C:
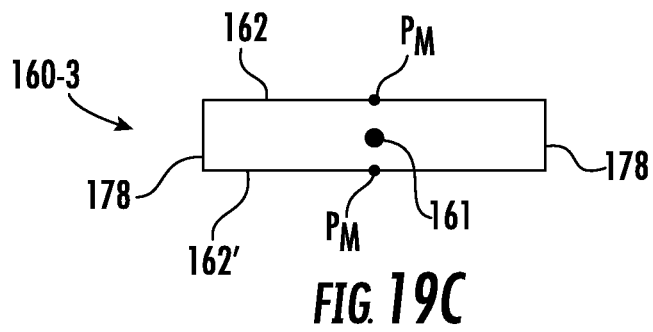
FIG. 19C schematically illustrates a close-up end view of a low-profile optical fiber configured as a flat optical fiber with straight edges according to one or more embodiments described and illustrated herein.
Figure 19D:
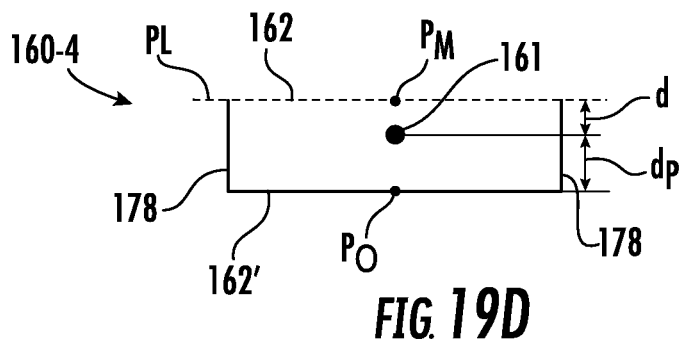
FIG. 19D schematically illustrates a close-up end view of a low-profile optical fiber configured as a flat optical fiber with straight edges wherein the core is closer to one surface than the opposing surface according to one or more embodiments described and illustrated herein.

The example low-profile optical fiber 160-2 of FIG. 19B has two curved surfaces 166 or sides. However, as shown in FIG. 19C, low-profile optical fibers 160-3 may have straight sides 178 rather than curved sides as shown in FIG. 19B. FIG. 19D illustrates a low-profile optical fiber 160-4 similar to the low-profile optical fiber 160-3 of FIG. 19C except that the core 161 is closer to flat surface 162 than flat surface 162'. Therefore, minimum perimeter point $P_M$ resides on flat surface 162 and other perimeter points, such as $P_O$ are farther away from the core 161 on flat surface 162'.

Figure 19E:
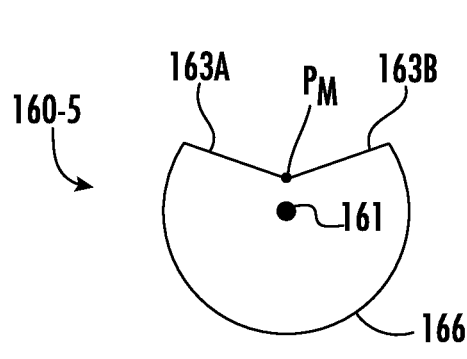
FIG. 19E schematically illustrates a close-up end view of a low-profile optical fiber configured as having a V-groove comprised of two flat surfaces according to one or more embodiments described and illustrated herein.

The minimum perimeter point P may be defined by more than one surface in some embodiments. Referring to FIG. 19E, the example low-profile optical fiber 160-5 has a V-shaped groove defined by a first surface 163A and a second surface 163B that intersect one another. Tire minimum perimeter point $P_M$ resides at a location where the first surface 163A and the second surface 163B intersect in a cross-section of the low-profile optical fiber 160-5. A positive V-shaped feature of a substrate (not shown) may be disposed within the V-shaped groove to properly orientate the low-profile optical fiber 160-5, for example. For example, an temporary alignment feature may have positive V-shaped features for aligning the low-profile optical fibers 160-5.

Figure 19F:
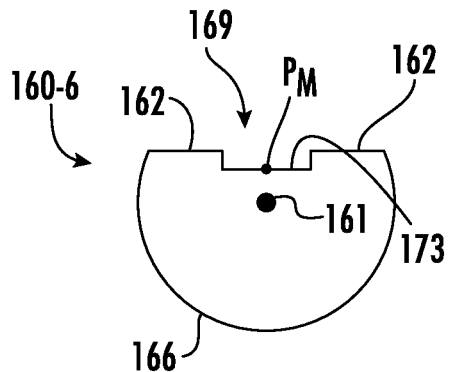
FIG. 19F schematically illustrates a close-up end view of a low-profile optical fiber configured as schematically illustrates a close-up end view of a low-profile optical fiber configured as having a notch within a flat surface according to one or more embodiments described and illustrated herein.

FIG. 19F illustrates yet another low-profile optical fiber 160-6 that is not rotationally symmetric with respect to the core 161. In this example, a notch 169 is formed at the center of a flat surface 162. The notch 169 defines a recessed surface 173 that is closer to the core 161 than the flat surface 162. Thus, the minimum perimeter point $P_M$ is located on the recessed surface 173. In some embodiments, the notch 169 may mate with a corresponding positive feature of either a permanent substrate of the overall assembly or a temporary alignment substrate, for example.

Figure 19G:
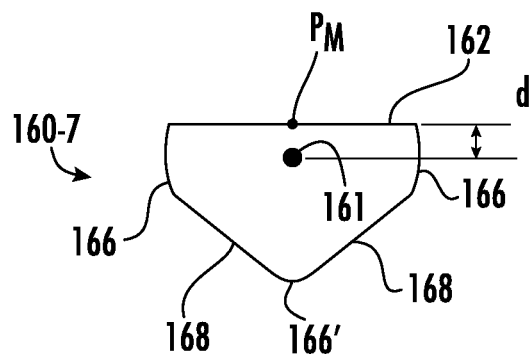
FIG. 19G schematically illustrates a close-up end view of a low-profile optical fiber configured as having two secondary flat surfaces and a primary flat surface according to one or more embodiments described and illustrated herein.

FIG. 19G illustrates another example low-profile optical fiber 160-7 having flat surface 162 defining the minimum perimeter point $P_M$ as well as two curved surfaces and two secondary flat surfaces 168. In the example of FIG. 19G, the low-profile optical fiber 160-7 also includes a flat surface 166'. However, in other embodiments the two flat surfaces 168 may intersect one another without flat surface 166'.

Figure 19H:
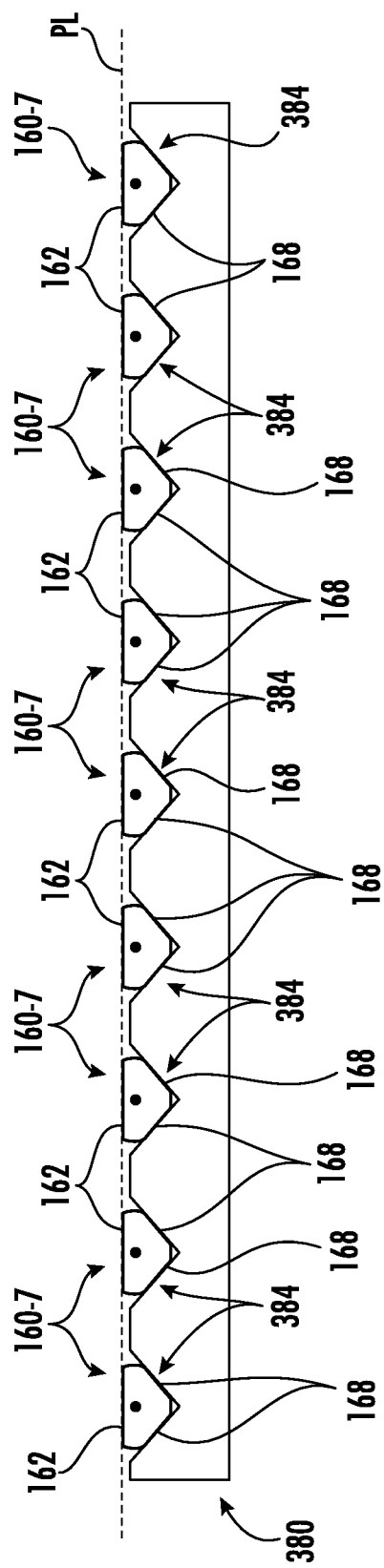
FIG. 19H schematically illustrates a plurality of low-profile optical fibers as depicted in FIG. 19G disposed within a V-groove substrate according to one or more embodiments described and illustrated herein.

These secondary flat surfaces 168 may be disposed within V-grooves 354 of a V-groove substrate 380 as shown in FIG. 19H (e.g., similar to the V-groove substrate 151 shown in FIGS. 3 and 4). The secondary flat surfaces 168 contact the walls of the V-grooves 384, which force the low-profile optical fibers 160-7 into a proper orientation such that their flat surfaces 162 are co-planar and define a plane PL. Thus, the secondary flat surfaces 168 may simplify the fiber alignment process.

Figure 19I:
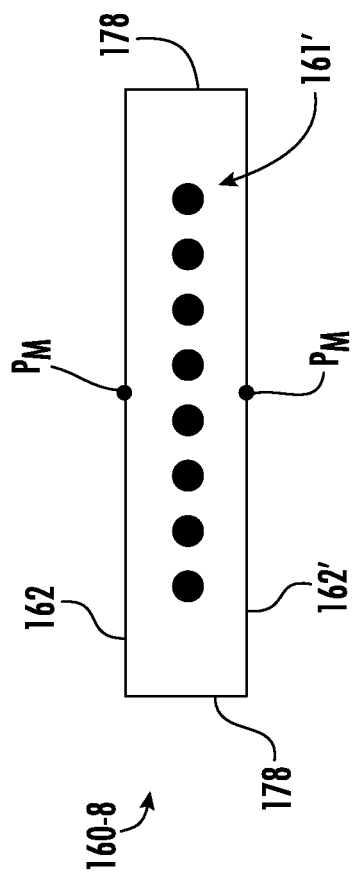
FIG. 19I schematically illustrates a flat low-profile optical fiber having a plurality of cores configured as a 1×8 array according to one or more embodiments described and illustrated herein.

FIG. 19I illustrates an example multi-core low-profile optical fiber 160-8 having a first flat surface 162 and a second flat surface 162', as well as flat sides 178. Because the cores 161' are equidistant from the first flat surface 162 and the second flat surface 162', minimum perimeter points $P_M$ are present on both the first flat surface 162 and the second flat surface 162'.

Figure 20:
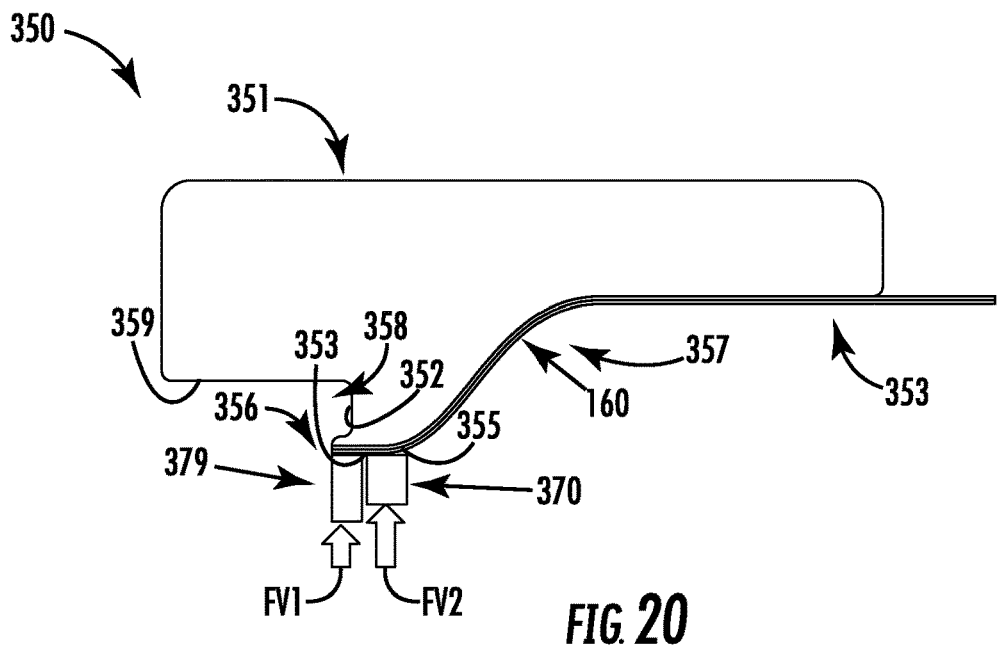
FIG. 20 schematically illustrates a side view of an assembly process for another example optical fiber PIC connector interface according to one or more embodiments described and illustrated herein.

In some embodiments, the interconnection substrate may be fabricated from a redrawn glass substrate. FIG. 20 is a cross-section view of an optical fiber PIC connector interface 350 comprising a redrawn glass interconnect substrate 351 with a precision bottom surface 535. Tire redrawn glass interconnect substrate 351 includes an upper support surface 359 where the redrawn glass interconnect substrate 351 may be adhesive-bonded to tire top surface 148 of the waveguide substrate 141, and a mechanical coupling surface 352 that provides an additional bonding surface to the edge 144 of the waveguide substrate 141. The redrawn glass interconnect substrate 351 further includes a projection 356 extending from the mechanical coupling surface 352 that supports a fiber array as it projects across a gap formed by the edge slot 142, and a precision fiber mounting surface 353 at the bottom of the protrusion where an optical fiber array is bonded to fire redrawn glass interconnect substrate 351. The redraw process ensures that fiber mounting surface is flat moving into tire page, so that low-profile optical fibers positioned on a flat surface have cores that fall into line.

The redrawn glass interconnect substrate 351 also includes a fiber routing surface 357 comprising convex and concave regions and a flat region for supporting the optical fiber array. The fiber routing surface 357 extends from the fiber mounting surface 353 to an opposite end of the redrawn glass interconnect substrate 351.

As shown in FIG. 20, ends of low-profile optical fibers 160 (and/or standard round fibers) may be aligned to each other on fiber mounting surface 353 of the redrawn glass interconnect substrate 351 using a reusable V-groove jig substrate 379 that precisely locate the low-profile optical fibers 160. The low-profile optical fibers 160 can be ribbonized or managed as arrays of individual fibers. An additional fiber orientation substrate 370 positioned adjacent to the V-groove jig substrate 379 can be used to provide proper rotational orientation of the low-profile optical fibers 160 during attachment. Forces $F_{V1}$ and $F_{B2}$ are applied to the V-groove jig substrate 379 and the fiber orientation substrate 370 to properly align and attach the one or more low-profile optical fibers 160.

Figure 21:
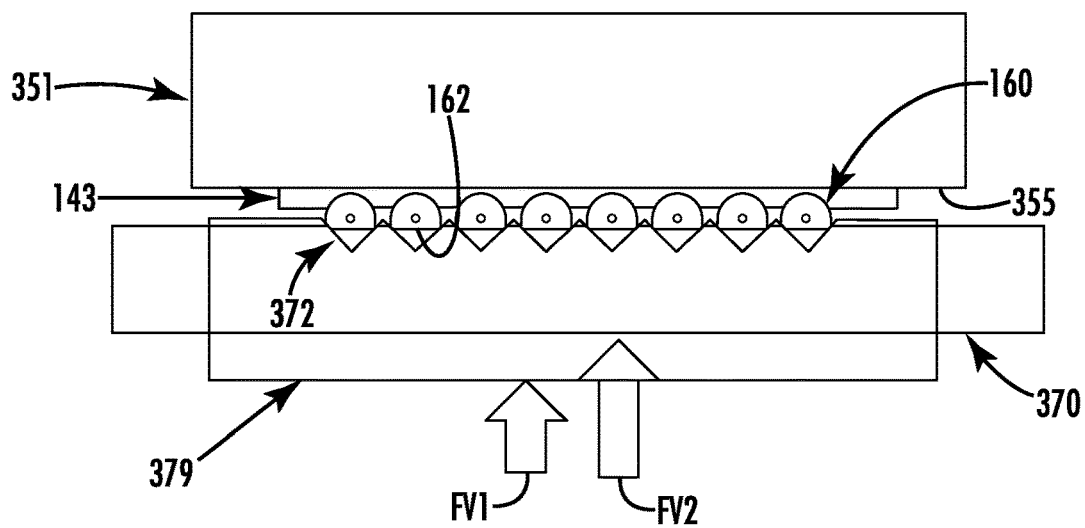
FIG. 21 schematically illustrates a front elevation view of assembly process for the example optical fiber PIC connector interface illustrated by FIG. 20 according to one or more embodiments described and illustrated herein.

FIG. 21 provides an end view of the V-groove jig substrate 379 and the fiber orientation substrate 370 as they align the low-profile optical fibers 160 on a redrawn glass interconnect substrate 351. The V-grooves 372 in the foreground aligns low-profile optical fibers 160 while the fiber orientation substrate 370 in the background provides rotational alignment of the low-profile optical fibers 160 so that all of their flat surfaces 162 are coplanar.

Figure 22:
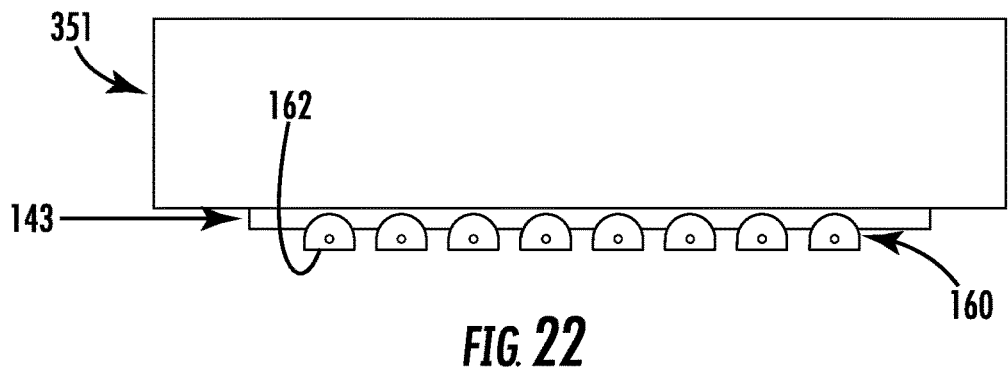
FIG. 22 schematically illustrates a front elevation view of the optical fiber PIC connector interface illustrated by FIGS. 20 and 21 according to one or more embodiments described and illustrated herein.

A thin film of adhesive 143 can be applied to the redrawn glass interconnect substrate 351 to prevent accidental adhesive attachment to the V-groove jig substrate 379 and the fiber orientation substrate 370. Alternatively, release sheets can also be used to prevent adhesive attachment to the V-groove jig substrate 379 and the fiber orientation substrate 370. FIG. 22 illustrates the array of low-profile optical fibers 160 attached to the redrawn glass interconnect substrate 351 after UV adhesive curing and removal of the V-groove jig substrate 379 and the fiber orientation substrate 370.

Figure 23:
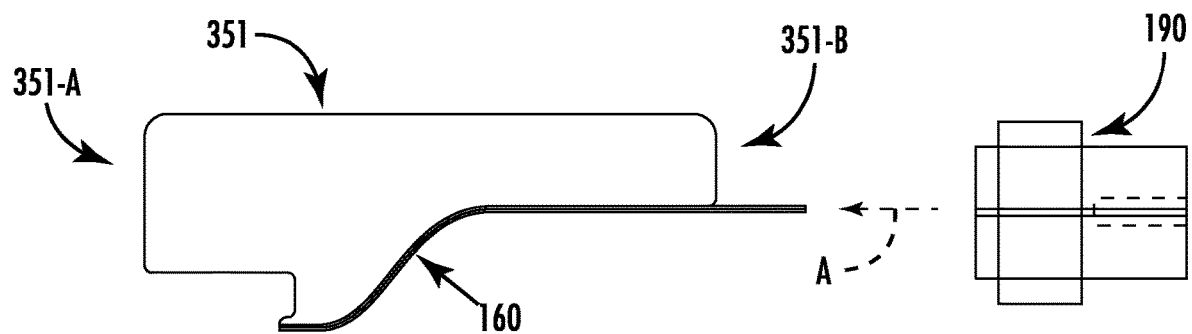
FIG. 23 schematically illustrates an assembly process to attach an optical connector to a redrawn glass interconnect substrate according to one or more embodiments described and illustrated herein.

Once the low-profile optical fibers have been attached to the redrawn glass interconnect substrate 351 at a first end 351-A, it may be desirable to planarize the ends of the low-profile optical fibers by polishing or dicing at the projection 356. Then, an optical connector 190 can be attached to a second end 315-B of the redrawn glass interconnect substrate 351 and the array low-profile optical fibers 160 using the alignment techniques described above (FIG. 23). The redrawn glass interconnect substrate 351 can include additional features on its second end 351-B that aid optical connector alignment to the redrawn glass interconnect substrate 351 and provide large area bonding surfaces.

Figure 24:
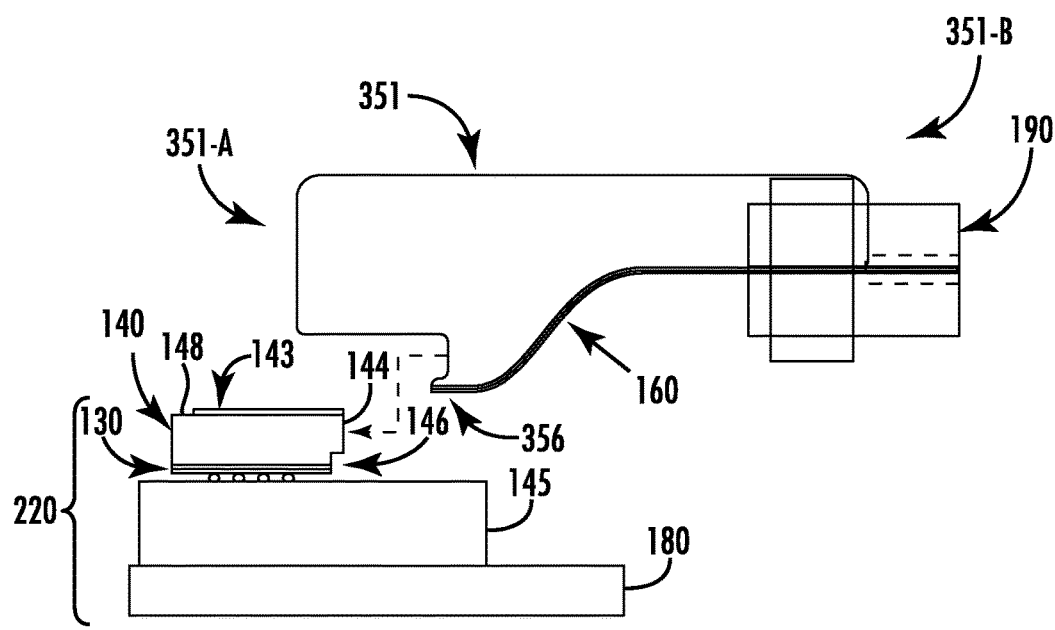
FIG. 24 schematically illustrates a side view of the optical connector illustrated by FIG. 23 attached to the redrawn glass interconnect substrate according to one or more embodiments described and illustrated herein.

FIG. 24 shows the optical connector 190 attached to the second end 351-B of the redrawn glass interconnect substrate 351. Next, the redrawn glass interconnect substrate 351 with low-profile optical fiber array is aligned and attached to the PIC 140. FIG. 24 shows attachment to a PIC 140 that is mounted with the waveguide layer 130 facing down (i.e., toward support surface 146), but the approach could also be applied to a PIC 140 that has the waveguide layer 130 facing up (i.e., away from support surface 146). The projection 356 is disposed within the slot 142 when the redrawn glass interconnect substrate 351 is mounted to the PIC 140.

Figure 25:
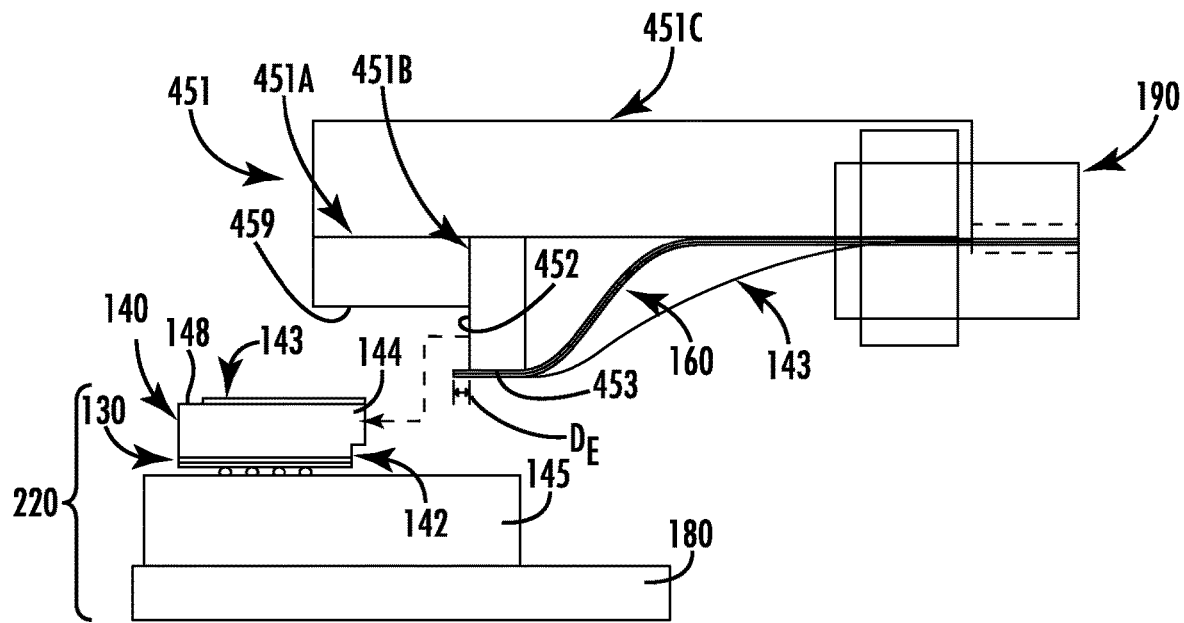
FIG. 25 schematically illustrates a side view of another example optical fiber PIC connector interface being attached to a PIC according to one or more embodiments described and illustrated herein.

The various features of the redrawn glass interconnect substrate shown in FIGS. 20-24 can be provided by a glass interconnect component 451 formed from multiple glass blocks, as shown in FIG. 25. The glass interconnect component 451 can be assembled from long glass substrate strips placed in an assembly jig (not shown). After adhesive UV curing, the long strip component can be diced into individual glass interconnect components 451. In the example of FIG. 25, the glass interconnect component 451 comprises a longitudinal block 451C, a support block 451A that is coplanar with the longitudinal block 451C, and a fiber support block 451B that is transverse (e.g., perpendicular or substantially perpendicular) to the longitudinal block 451C.

One or more low-profile optical fibers 160 are aligned and attached to a fiber mounting surface 453 of the fiber support block 451B using the approach above with respect to FIGS. 20 and 21. After alignment, the one or low-profile optical fibers 160 can be protected from damage by covering it with adhesive 143 as it is routed to the MT ferrule 191. In some embodiments, the ends of the one or more low-profile optical fibers 160 may extend beyond a mechanical coupling surface 452 of the fiber support block 451B by a distance $D_E$ such that it may extend into the edge slot 142 of the PIC 140. When the glass interconnect component 451 is mated to the PIC 140, the mechanical coupling surface 452 contacts the edge 144 of the waveguide substrate 141, and a support surface 459 contacts the top surface 148 of the waveguide substrate 141 and is secured thereto by an adhesive 143.

Figure 26:
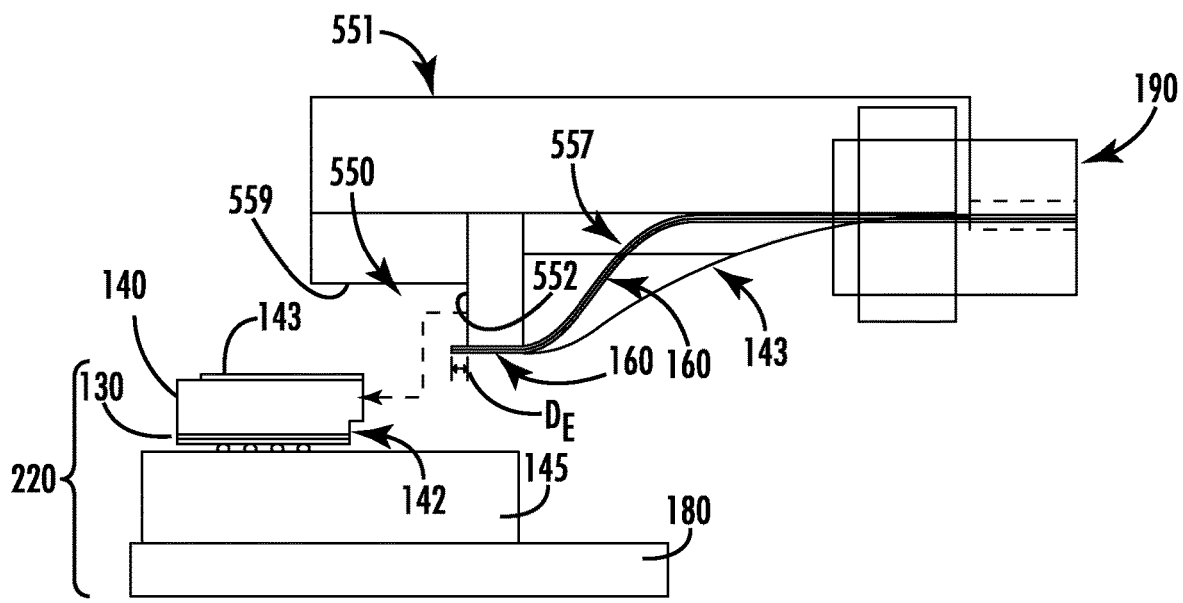
FIG. 26 schematically illustrates a side view of another example optical fiber PIC connector interface being attached to a PIC according to one or more embodiments described and illustrated herein.

Glass interconnect substrates can also be formed by dicing the required profile out of a single glass substrate as shown in FIG. 26. As with the previously described approach, complex features can be fabricated in parallel via sawing operations and then diced into individual glass interconnect substrates 551. For example, a notch 558 may be formed by a sawing operation such that a support surface 559 contacts a top surface 148 of the waveguide substrate 141, and a mechanical coupling surface 552 contacts an edge 144 of the waveguide substrate. An adhesive 143 may be used to secure the glass interconnect substrate 551 to the PIC 140. A fiber clearance notch 557 may also be formed in the substrate to provide a location for the one or more low-profile optical fibers 160 to be routed. The one or more low-profile optical fibers 160 may be protected and secured by an adhesive 143 as described above.

It should now be understood that embodiments provide for optical assemblies and PIC assemblies that use a low-profile optical fiber to enable shallow etching notches in fabricating PIC assemblies.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, tire disclosure should be construed to include everything within the scope of the appended claims and their equivalents.

The invention claimed is:

1. A photonic integrated chip (PIC) assembly comprising:
a PIC comprising:
    a waveguide substrate comprising a mechanical coupling edge;
    a waveguide layer comprising at least one waveguide and an optical coupling edge, wherein the waveguide layer is positioned on the waveguide substrate and the at least one waveguide terminates at the optical coupling edge; and
an optical fiber PIC connector interface comprising:
    at least one low-profile optical fiber comprising an end face, at least one core and a cladding layer, wherein the end face is non-rotationally symmetric with respect to the core, and the cladding layer comprises at least one minimum perimeter point that is a minimum distance from the at least one core as compared to remaining perimeter points of the cladding; and
    an interconnect substrate comprising a fiber mounting surface, wherein:
        the at least one low-profile optical fiber is disposed on the fiber mounting surface such that one or more surfaces of the cladding defining the at least one minimum perimeter point faces away from the fiber mounting surface; and
        the end face of the at least one low-profile optical fiber is edge-coupled to the optical coupling edge of the waveguide layer.

2. The PIC assembly of claim 1, wherein a gap between the end face of the at least one low-profile optical fiber and the optical coupling edge of the waveguide layer is less than or equal to 5 µm.

3. The PIC assembly of claim 1, wherein the at least one minimum perimeter point of the cladding layer is defined by a flat surface of the at least one low-profile optical fiber, and the flat surface defines a single plane that is coplanar to the fiber mounting surface.

4. The PIC assembly of claim 1, wherein the waveguide layer is integral with the waveguide substrate.

5. The PIC assembly of claim 1, wherein the waveguide layer is bonded to the waveguide substrate.

6. The PIC assembly of claim 1, wherein the waveguide substrate is silicon.

7. The PIC assembly of claim 1, wherein the fiber mounting surface of the interconnect substrate comprises at least one groove, and the at least one low-profile optical fiber is disposed within the at least one groove.

8. The PIC assembly of claim 7, wherein the at least one low-profile optical fiber comprises a curved surface that is disposed within the at least one groove.

9. The PIC assembly of claim 7, wherein the at least one low-profile optical fiber is bonded to the at least one groove.

10. The PIC assembly of claim 1, wherein:
the at least one low-profile optical fiber comprises a curved surface;
the fiber mounting surface of the interconnect substrate is planar; and
the at least one low-profile optical fiber is bonded to the fiber mounting surface such that the curved surface faces the fiber mounting surface.

11. The PIC assembly of claim 1, wherein the interconnect substrate comprises glass.

12. The PIC assembly of claim 1, wherein the waveguide substrate comprises an edge slot defined by a ledge that protrudes a distance away from the optical coupling edge of the waveguide layer, and a surface of the ledge is offset from a center of the at least one waveguide by an offset distance.

13. The PIC assembly of claim 12, wherein at least a portion of the at least one low-profile optical fiber is disposed within the edge slot of the waveguide substrate.

14. The PIC assembly of claim 13, wherein:
the PIC assembly comprises a support substrate comprising a support surface;
the waveguide substrate and the waveguide layer are coupled to the support surface of the support substrate such that the waveguide layer faces the support surface;
the interconnect substrate comprises a notch defined by a mechanical coupling surface and an upper support surface that is transverse to the mechanical coupling surface;
the mechanical coupling surface of the interconnect substrate is coupled to an edge of the ledge of the waveguide substrate; and the upper support surface of the interconnect substrate is coupled to a surface of the waveguide substrate that is opposite from the waveguide layer.

15. The PIC assembly of claim 14, wherein the fiber mounting surface of the interconnect substrate comprises at least one groove and the at least one low-profile optical fiber is disposed within the at least one groove.

16. The PIC assembly of claim 13, wherein:
the PIC assembly comprises a support substrate comprising a support surface;
the waveguide substrate and the waveguide layer are coupled to the support surface of the support substrate such that the waveguide layer faces the support surface;
the interconnect substrate comprises a mechanical coupling surface that is coupled to an edge of the ledge of the waveguide substrate; and
the PIC assembly further comprises a support block comprising a first surface that is coupled to the mechanical coupling surface of the interconnect substrate and a second surface that is bonded to a surface of the waveguide substrate that is opposite from the waveguide layer.

17. The PIC assembly of claim 13, wherein:
the PIC assembly comprises a support substrate comprising a support surface;
the waveguide substrate and the waveguide layer are coupled to the support surface of the support substrate such that the waveguide layer faces the support surface;
the interconnect substrate comprises:
  a notch defined by a mechanical coupling surface and an upper support surface that is transverse to the mechanical coupling surface; and
  a protrusion extending away from the mechanical coupling surface such that at least a portion of the fiber mounting surface of the interconnect substrate is located on the protrusion;
the mechanical coupling surface of the interconnect substrate is coupled to an edge of the ledge of the waveguide substrate; and
the upper support surface of the interconnect substrate is coupled to a surface of the waveguide substrate that is opposite from the waveguide layer.

18. The PIC assembly of claim 17, wherein the interconnect substrate is fabricated from redrawn glass.

19. The PIC assembly of claim 17, wherein:
a fiber routing surface extends from the fiber mounting surface to an end of the interconnect substrate; and
the at least one low-profile optical fiber is disposed on the fiber mounting surface and the fiber routing surface of the interconnect substrate.

20. The PIC assembly of claim 1, wherein:
the end face is at a first end of the at least one low-profile optical fiber;
the at least one low-profile optical fiber comprises a second end that extends beyond an end of the interconnect substrate; and
the second end of the at least one low-profile optical fiber is coupled to an optical connector that is coupled to the end of the interconnect substrate.

21. The PIC assembly of claim 1, wherein:
the end face is at a first end of the at least one low-profile optical fiber;
the at least one low-profile optical fiber comprises a second end that extends beyond an end of the interconnect substrate;
the second end of the at least one low-profile optical fiber is coupled to an optical connector that is coupled to the end of the interconnect substrate; and
the at least one low-profile optical fiber is secured to the interconnect substrate by an adhesive.

22. The PIC assembly of claim 1, wherein:
the end face is at a first end of the at least one low-profile optical fiber; and
the at least one low-profile optical fiber comprises a second end that is coupled to an optical connector.

23. The PIC assembly of claim 22, wherein:
the optical fiber PIC connector interface further comprises a ferrule comprising at least one bore; and
the second end of the at least one low-profile optical fiber is disposed within the at least one bore such that an adhesive is provided within a void between the one or more surfaces of the cladding defining the at least one minimum perimeter point of the at least one low-profile optical fiber of the at least one low-profile optical fiber and an interior surface of the at least one bore.

24. The PIC assembly of claim 23, wherein:
the at least one low-profile optical fiber comprises a plurality of low-profile optical fibers and the at least one bore comprises a plurality of bores; and
the at least one minimum perimeter point of the cladding layer of each low-profile optical fiber of the plurality of low-profile optical fibers is defined by a flat surface; and
the flat surface of each low-profile optical fiber of the plurality of low-profile optical fibers is coplanar with the flat surface of other low-profile optical fibers of the plurality of low-profile optical fibers within the plurality of bores.

25. The optical fiber PIC connector interface of claim 1, wherein the at least one low-profile optical fiber comprises a plurality of bores arranged in at least one plane.

26. The optical fiber PIC connector interface of claim 1, wherein the one or more surfaces defining the at least one minimum perimeter point are a first surface and a second surface defining a V-groove in the at least one low-profile optical fiber such that the at least one minimum perimeter point is at an intersection between the first surface and the second surface.

27. The optical fiber PIC connector interface of claim 1, wherein the remaining perimeter points define a first surface and a second surface that define a V-shape for placement in a V-groove substrate.

28. The optical fiber PIC connector interface of claim 1, wherein the at least one core comprises a plurality of cores arranged in an array.

* * * * *